(12) United States Patent
Bok et al.

(10) Patent No.: US 12,373,072 B2
(45) Date of Patent: Jul. 29, 2025

(54) ELECTRONIC DEVICE INCLUDING A SENSOR LAYER HAVING ELECTRODE GROUPS AND CONNECTING TRACE LINES

(71) Applicant: SAMSUNG DISPLAY CO., LTD., Yongin-si (KR)

(72) Inventors: Seung-Lyong Bok, Yongin-si (KR); Kicheol Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/537,755

(22) Filed: Dec. 12, 2023

(65) Prior Publication Data
US 2024/0264709 A1 Aug. 8, 2024

(30) Foreign Application Priority Data
Feb. 8, 2023 (KR) .................. 10-2023-0016758

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/04164* (2019.05); *G06F 3/0443* (2019.05)

(58) Field of Classification Search
CPC .. G06F 3/0446; G06F 3/0412; G06F 3/04164; G06F 3/0443; G06F 3/0448; G06F 2203/04111; G06F 2203/04112
See application file for complete search history.

(56) References Cited

U.S. PATENT DOCUMENTS

| | | |
|---|---|---|
| 9,851,856 B2 | 12/2017 | Bok |
| 10,976,847 B2 | 4/2021 | Park et al. |
| 11,042,241 B2 | 6/2021 | Bok et al. |
| 11,500,501 B2 | 11/2022 | Lee et al. |
| 11,507,233 B2 | 11/2022 | Gwon et al. |
| 2020/0167041 A1* | 5/2020 | Jeong ............... G06F 3/0443 |

FOREIGN PATENT DOCUMENTS

| | | |
|---|---|---|
| KR | 10-2019-0137192 A | 12/2019 |
| KR | 10-2022-0005246 A | 1/2022 |
| KR | 10-2022-0084538 A | 6/2022 |
| KR | 10-2468288 | 11/2022 |

* cited by examiner

*Primary Examiner* — Liliana Cerullo
(74) *Attorney, Agent, or Firm* — F. CHAU & ASSOCIATES, LLC

(57) ABSTRACT

An electronic device includes a display layer, and a sensor layer. A sensing area and a peripheral area are defined within the sensor layer. The sensor layer includes a plurality of first electrodes disposed in the sensing area, a plurality of first trace lines, a plurality of second electrode groups disposed in the sensing area, and a plurality of second trace lines electrically connected to the plurality of second electrode groups and overlapping the sensing area. The plurality of second electrode groups include a first-second electrode and a second-second electrode. The plurality of second trace lines include a plurality of first-second trace lines electrically connected to the first-second electrode and a second-second trace line electrically connected to the second-second electrode.

26 Claims, 29 Drawing Sheets

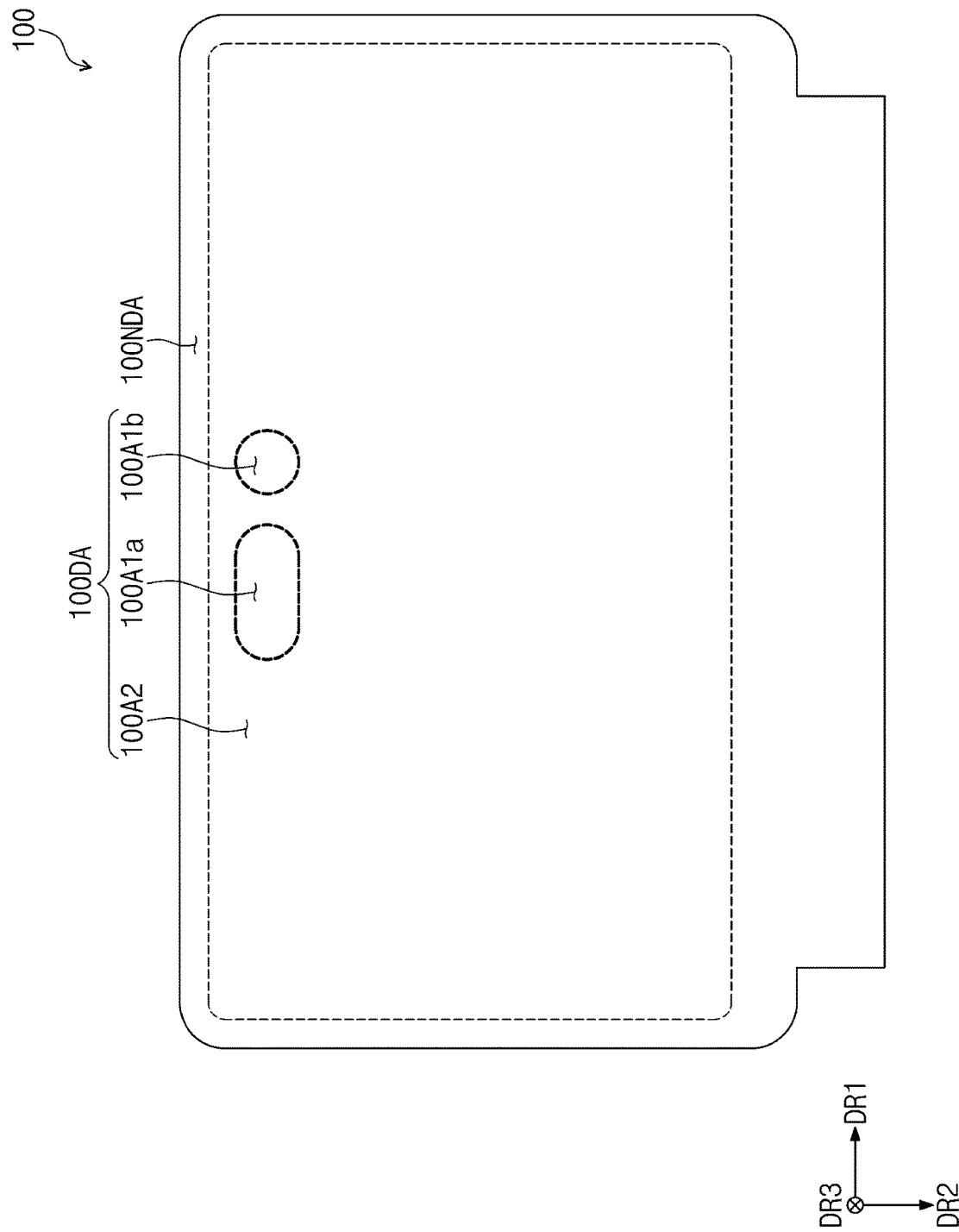

ELECTRONIC DEVICE INCLUDING A SENSOR LAYER HAVING ELECTRODE GROUPS AND CONNECTING TRACE LINES

CROSS-REFERENCE TO RELATED APPLICATIONS

This application claims priority under 35 U.S.C. § 119 to Korean Patent Application No. 10-2023-0016758 filed on Feb. 8, 2023 in the Korean Intellectual Property Office, the disclosures of which is herein incorporated by reference in its entirety.

TECHNICAL FIELD

The present disclosure relates to an electronic device and, more specifically, to an electronic device including a sensor layer.

DISCUSSION OF THE RELATED ART

Multimedia electronic devices such as a television, a mobile phone, a tablet computer, a navigation device, a game console, a display for a vehicle, and the like may display images, and may provide a touch-based input scheme that allows a user to easily, intuitively, and conveniently input information or commands directly to the displayed image in addition to typical input schemes such as the use of a button, a keyboard, and a mouse.

SUMMARY

An electronic device includes a display layer including a display area and a non-display area adjacent to the display area. The display area includes first area having a first light transmittance and a second area having a second light transmittance that is lower than the first light transmittance. A sensor layer includes a sensing area and a peripheral area adjacent to the sensing area. The sensor layer includes a plurality of first electrodes disposed in the sensing area and arranged along a first direction, a plurality of first trace lines electrically connected to the plurality of first electrodes, a plurality of second electrode groups disposed in the sensing area and arranged along a second direction intersecting the first direction, and a plurality of second trace lines electrically connected to the plurality of second electrode groups and overlapping the sensing area. The plurality of second electrode groups include a first-second electrode adjacent to the first area and a second-second electrode spaced apart from the first area. The plurality of second trace lines include a plurality of first-second trace lines electrically connected to the first-second electrode and a second-second trace line electrically connected to the second-second electrode.

The first-second electrode may include a first sub-electrode and a second sub-electrode spaced apart from the first sub-electrode with the first area interposed therebetween, and the plurality of first-second trace lines may be electrically connected to the first and second sub-electrodes in a one-to-one correspondence, respectively.

The sensor layer may further include a plurality of pads respectively electrically connected to the plurality of first-second trace lines.

The sensor layer may further include a pad electrically connected to the plurality of first-second trace lines.

A plurality of sensing units may be defined in the sensor layer, and each of the plurality of sensing units may correspond to an area where one of the plurality of first electrodes and one of the plurality of second electrode groups intersect each other.

The plurality of sensing units may include a first sensing unit having a first size and a second sensing unit having a second size that is greater than the first size.

The second sensing unit may be disposed in an area adjacent to the first area, and the first sensing unit may be spaced apart from the second sensing unit in the second direction.

A width in the first direction of the first sensing unit may be equal to a width in the first direction of the second sensing unit, and a width in the second direction of the first sensing unit may be smaller than a width in the second direction of the second sensing unit.

The second sensing unit may be disposed in an area adjacent to the first area, and the first sensing unit may be spaced apart from the second sensing unit in the first direction.

A width in the first direction of the first sensing unit may be smaller than a width in the first direction of the second sensing unit, and a width in the second direction of the first sensing unit may be smaller than a width in the second direction of the second sensing unit.

The plurality of sensing units may include a first sensing unit having a first shape and a second sensing unit having a second shape different from the first shape, and the first sensing unit may be disposed in an area closer to the first area than to the second sensing unit.

The sensor layer may include a first divided driving area and a second divided driving area adjacent to the first divided driving area in the first direction, and the first area may overlap the second divided driving area.

The plurality of second electrode groups may include a plurality of first divided electrodes overlapping the first divided driving area and arranged along the second direction, and a plurality of second divided electrodes overlapping the second divided driving area and arranged along the second direction. The plurality of second trace lines may include a plurality of first divided trace lines electrically connected to the plurality of first divided electrodes and a plurality of second divided trace lines electrically connected to the plurality of second divided electrodes. The number of the plurality of second divided trace lines may be equal to or greater than the number of plurality of first divided trace lines.

The number of plurality of second divided electrodes may be equal to or greater than the number of plurality of first divided electrodes.

A third area having a third light transmittance that is higher than the second light transmittance may be further defined in the display area of the display layer, and the third area may overlap either the first divided driving area or the second divided driving area.

The first area and the second area may display an image.

A hole where a portion of the display layer is omitted or removed may be defined in the first area of the display layer.

An electronic device includes a display layer including a display area and a non-display area adjacent to the display area. A sensor layer includes a sensing area and a peripheral area adjacent to the sensing area. The sensor layer includes a plurality of first electrodes disposed in the sensing area and arranged along a first direction, a plurality of first trace lines electrically connected to the plurality of first electrodes, a plurality of second electrode groups disposed in the sensing area and arranged along a second direction intersecting the first direction, and a plurality of second trace lines electrically connected to the plurality of second electrode groups and overlapping the sensing area. The plurality of second electrode groups include a first-second electrode and a second-second electrode spaced apart from the first-second electrode in the second direction. The plurality of second trace lines include a plurality of first-second trace lines electrically connected to the first-second electrode and a second-second trace line electrically connected to the second-second electrode. A number of the plurality of first-second trace lines is greater than a number of the second-second trace lines.

The first-second electrode may include a first sub-electrode and a second sub-electrode spaced apart from the first sub-electrode in the first direction, and the plurality of first-second trace lines may be electrically connected to the first and second sub-electrodes in a one-to-one correspondence, respectively.

A plurality of sensing units may be defined in the sensor layer, and each of the plurality of sensing units may correspond to an area where one of the plurality of first electrodes and one of the plurality of second electrode groups intersect each other. The plurality of sensing units may include a first sensing unit having a first size and a second sensing unit having a second size that is greater than the first size.

The second sensing unit may include a portion of the first-second electrode, and the first sensing unit may include a portion of the second-second electrode.

The plurality of second electrode groups may include a plurality of first divided driving electrodes and a plurality of second divided driving electrodes spaced apart from the plurality of first divided driving electrodes in the first direction. The first-second electrode and the second-second electrode may be included in the plurality of second divided driving electrodes. The first sensing unit may include a portion of the first-second electrode, and the second sensing unit may include a portion of one of the plurality of first divided driving electrodes.

An electronic device includes a display layer including a display area and a non-display area adjacent to the display area. The display area includes first area having a first light transmittance and a second area having a second light transmittance that is lower than the first light transmittance. A sensor layer includes a first divided driving area, and a second divided driving area adjacent to the first divided driving area in a first direction and overlapping the first area. The sensor layer includes a plurality of first divided electrodes overlapping the first divided driving area and arranged along a second direction intersecting the first direction. A plurality of second divided electrodes overlaps the second divided driving area and are arranged along the second direction. A plurality of first divided trace lines electrically connected to the plurality of first divided electrodes. A plurality of second divided trace lines are electrically connected to the plurality of second divided electrodes. A number of the plurality of second divided trace lines is greater than a number of the plurality of first divided trace lines.

One of the plurality of second divided electrodes may include a first sub-electrode and a second sub-electrode spaced apart from the first sub-electrode with the first area interposed therebetween. One of the plurality of second divided trace lines may be electrically connected to the first sub-electrode, and another of the plurality of second divided trace lines may be electrically connected to the second sub-electrode.

The sensor layer may further include a plurality of pads respectively connected to the one second divided trace line and the another second divided trace line.

The sensor layer may further include a pad electrically connected to the one second divided trace line and the another second divided trace line.

A shape of the plurality of first divided electrodes may be different from a shape of the plurality of second divided electrodes.

BRIEF DESCRIPTION OF THE FIGURES

The above and other objects and features of the present disclosure will become apparent by describing in detail embodiments thereof with reference to the accompanying drawings.

FIG. 4 is a plan view of a display layer according to an embodiment of the present disclosure.

DETAILED DESCRIPTION

Figure 1:
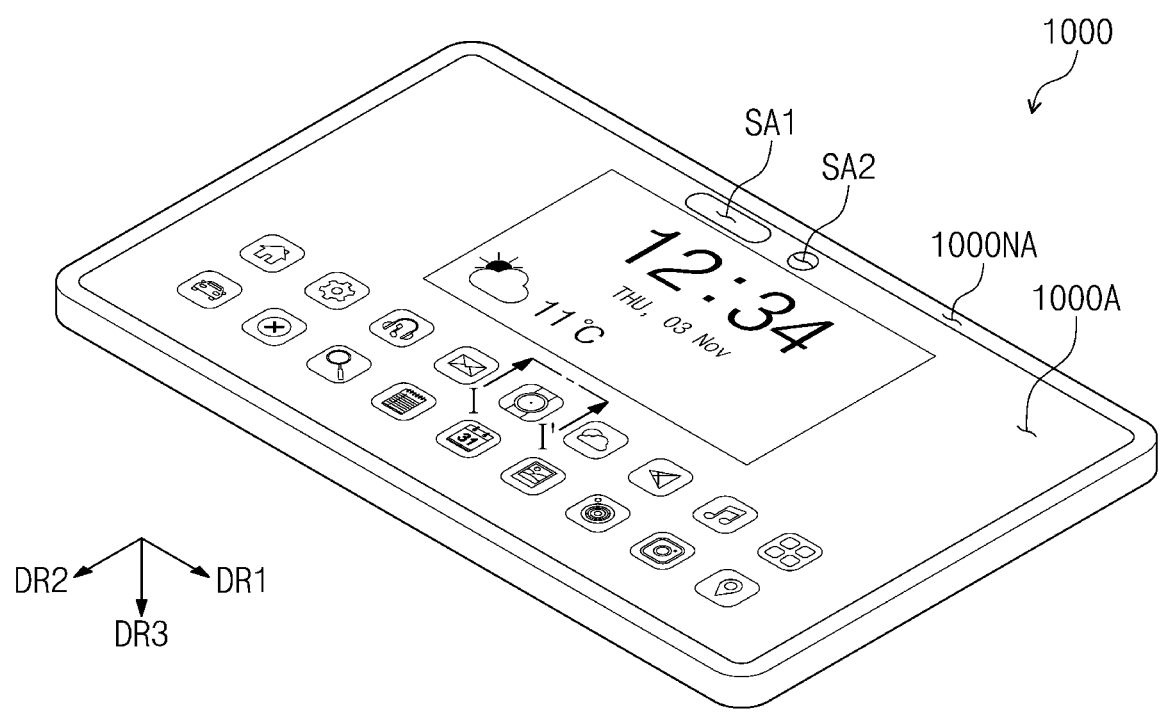
FIG. 1 is a perspective view of an electronic device according to an embodiment of the present disclosure.

Herein, when a component (or a region, a layer, a portion, and the like) is referred to as being "on", "connected to", or "coupled to" another component, it may mean that the component may be directly disposed/connected/coupled on another component or a third component may be disposed between the component and another component.

Like reference numerals may refer to like components throughout the specification and the drawings. As used herein, the term "and/or" may include all of one or more combinations that the associated components may define.

Terms such as first, second, and the like may be used to describe various components, but the components should not necessarily be limited by the terms. The above terms are used for the purpose of distinguishing one component from another. For example, without departing from the scope of the present disclosure, a first component may be named as a second component, and similarly, the second component may also be named as the first component. The singular expression includes the plural expression unless the context clearly dictates otherwise.

In addition, terms such as "beneath", "below", "on", "above" are used to describe the relationship of the components shown in the drawings. The above terms are relative concepts, and are described with reference to directions indicated in the drawings.

It should be understood that terms such as "include" or "have" are intended to specify that a feature, a number, a step, an operation, a component, a part, or a combination thereof described herein is present, and do not preclude a possibility of addition or existence of one or more other features or numbers, steps, operations, components, parts, or combinations thereof.

Hereinafter, embodiments of the present disclosure will be described with reference to drawings.

FIG. 1 is a perspective view of an electronic device 1000 according to an embodiment of the present disclosure.

Referring to FIG. 1, the electronic device 1000 may be a device that is activated in response to an electrical signal. For example, the electronic device 1000 may be a mobile phone, a foldable mobile phone, a laptop computer, a television, a tablet computer, a vehicle navigation system, a game console, or a wearable device, but might not necessarily be limited thereto. In FIG. 1, it is illustrated that the electronic device 1000 is the tablet computer as an example.

An active area 1000A and a peripheral area 1000NA may be defined in the electronic device 1000. The electronic device 1000 may display an image via the active area 1000A. The active area 1000A may include a plane defined by a first direction DR1 and a second direction DR2. The peripheral area 1000NA may at least partially surround the active area 1000A. In one embodiment of the present disclosure, the peripheral area 1000NA may be omitted.

One or more sensor areas SA1 and SA2 may be defined in the active area 1000A. Although FIG. 1 shows the two sensor areas SA1 and SA2 as an example, the number of sensor areas SA1 and SA2 provided in the electronic device 1000 is not necessarily limited thereto. Each of the sensor areas SA1 and SA2 may overlap at least one sensor. For example, each of the sensor areas SA1 and SA2 may overlap a front camera module, an illuminance sensor, a proximity sensor, an infrared camera, or a dot projector.

In one embodiment of the present disclosure, each of the sensor areas SA1 and SA2 may be an inactive area that does not display the image and does not sense a touch. In this case, it may be understood that the sensor areas SA1 and SA2 are at least partially surrounded by the active area 1000A. In one embodiment of the present disclosure, each of the sensor areas SA1 and SA2 may be an active area that displays the image and senses the touch. Alternatively, each of the sensor areas SA1 and SA2 may be an active area that displays the image and does not sense the touch. In this case, the sensor areas SA1 and SA2 may be understood as portions of the active area 1000A.

A thickness direction of the electronic device 1000 may be parallel to a third direction DR3 intersecting the first direction DR1 and the second direction DR2. Accordingly, front surfaces (or upper surfaces) and rear surfaces (or lower surfaces) of elements constituting the electronic device 1000 may be defined based on the third direction DR3.

Although the bar-type electronic device 1000 is shown as an example in FIG. 1, the present disclosure is not necessarily limited thereto. For example, descriptions to be made below may be applied to various electronic devices such as the foldable electronic device 1000, the rollable electronic device 1000, or the slideable electronic device 1000.

Figure 2:
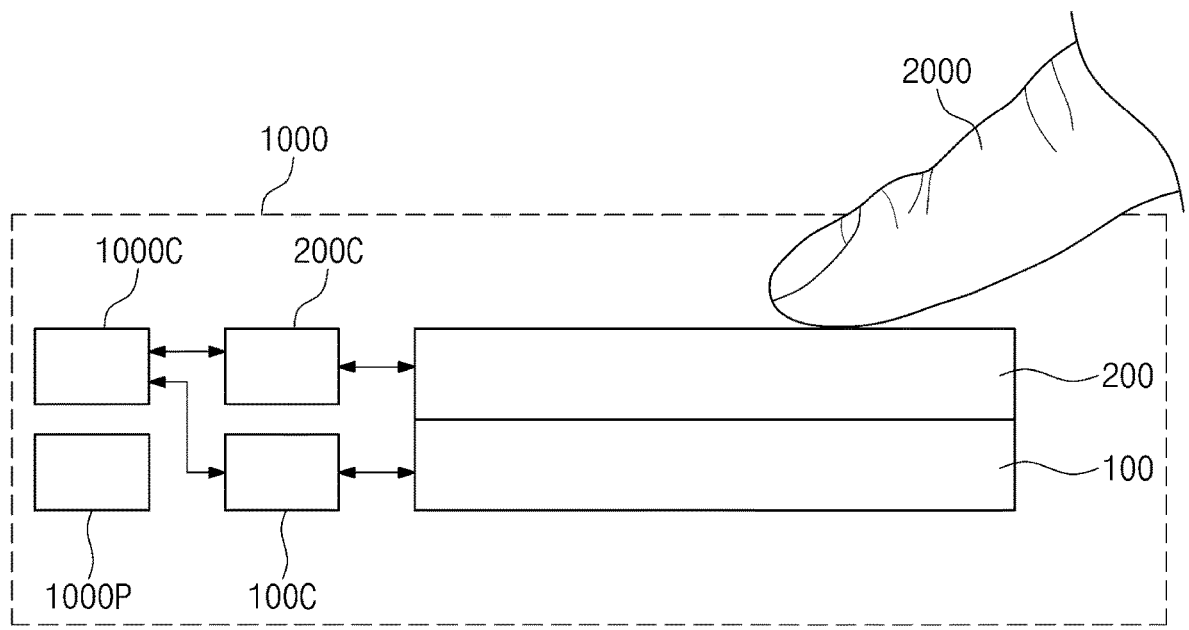
FIG. 2 is a block diagram illustrating an example of use of an electronic device according to an embodiment of the present disclosure.

FIG. 2 is a block diagram illustrating an example of use of the electronic device 1000 according to an embodiment of the present disclosure.

Referring to FIG. 2, the electronic device 1000 may include a display layer 100, a sensor layer 200, a display driver 100C, a sensor driver 200C, a main driver 1000C, and a power circuit 1000P.

The display layer 100 may be a component that substantially generates the image. The display layer 100 may be a light emitting display layer. For example, the display layer 100 may be an organic light emitting display layer, an inorganic light emitting display layer, an organic-inorganic light emitting display layer, a quantum dot display layer, and a micro LED display layer, or a nano LED display layer.

The sensor layer 200 may be disposed on the display layer 100. The sensor layer 200 may sense an external input. The sensor layer 200 may be an integrated sensor continuously formed during a preparing process of the display layer 100, or the sensor layer 200 may be an external sensor attached to the display layer 100.

The main driver 1000C may control overall operations of the electronic device 1000. For example, the main driver 1000C may control operations of the display driver 100C and the sensor driver 200C. The main driver 1000C may include at least one microprocessor, and the main driver 1000C may also be referred to as a host. The main driver 1000C may further include a graphic controller.

The display driver 100C may drive the display layer 100. The display driver 100C may receive image data and a control signal from the main driver 1000C. The control signal may include various signals. For example, the control signal may include an input vertical synchronization signal, an input horizontal synchronization signal, a main clock, a data enable signal, and the like.

The sensor driver 200C may drive the sensor layer 200. The sensor driver 200C may receive a control signal from the main driver 1000C. The control signal may include a clock signal of the sensor driver 200C.

The power circuit 1000P may include a power management integrated circuit (PMIC). The power circuit 1000P may generate a plurality of driving voltages for driving the display layer 100, the sensor layer 200, the display driver 100C, and the sensor driver 200C. For example, the plurality of driving voltages may include a gate high voltage, a gate low voltage, a first power voltage (e.g., ELVSS voltage), a second power voltage (e.g., ELVDD voltage), an initialization voltage, and the like, but might not be particularly limited to the above examples.

The electronic device 1000 may sense external inputs. For example, the electronic device 1000 may sense a passive input by a touch 2000. The touch 2000 may include all input means capable of providing a change in a capacitance, such as a user's body and an input device (e.g., a stylus/pen).

Figure 3A:
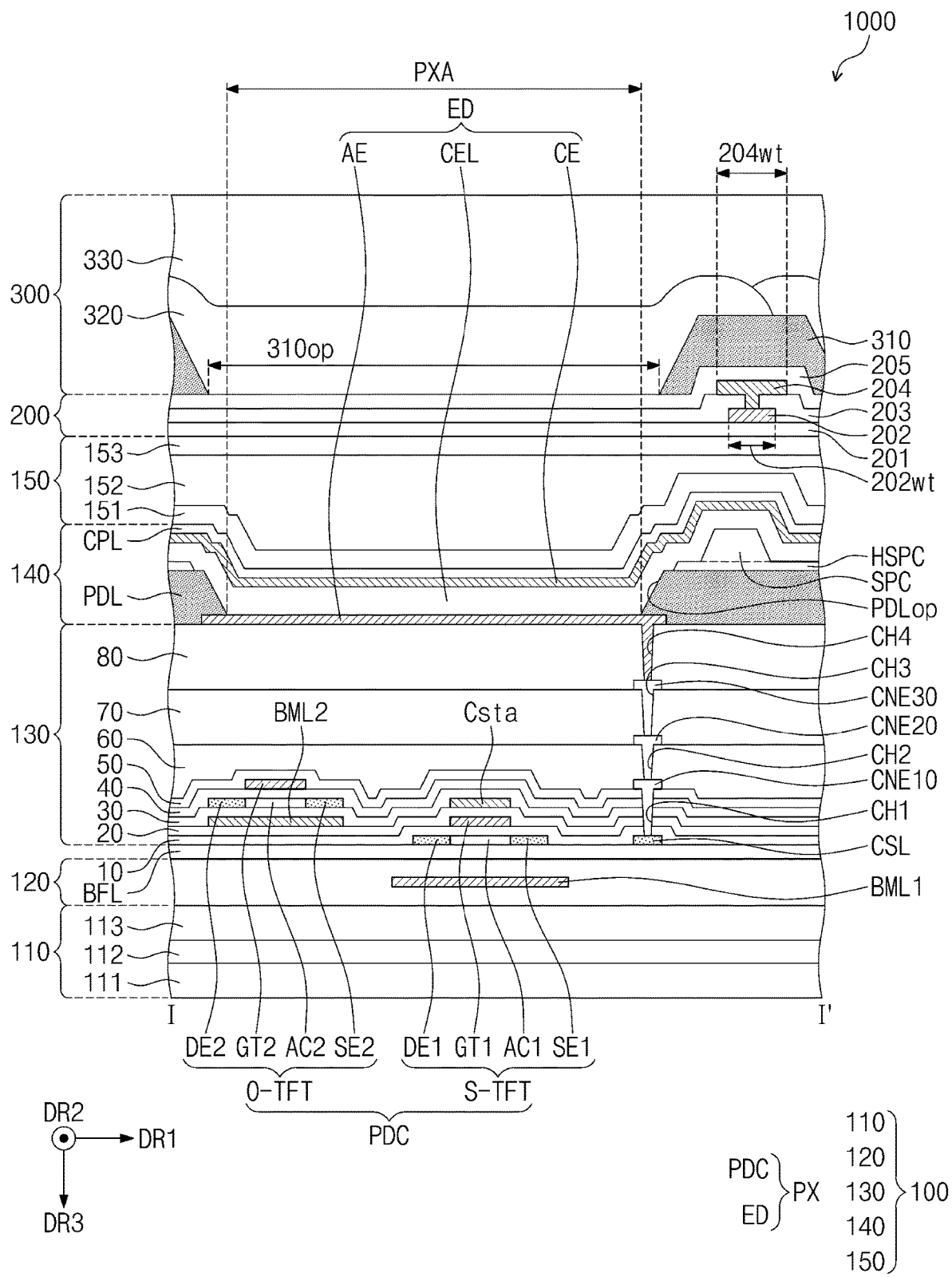
FIG. 3A is a cross-sectional view of an electronic device according to an embodiment of the present disclosure.
Figure 3B:
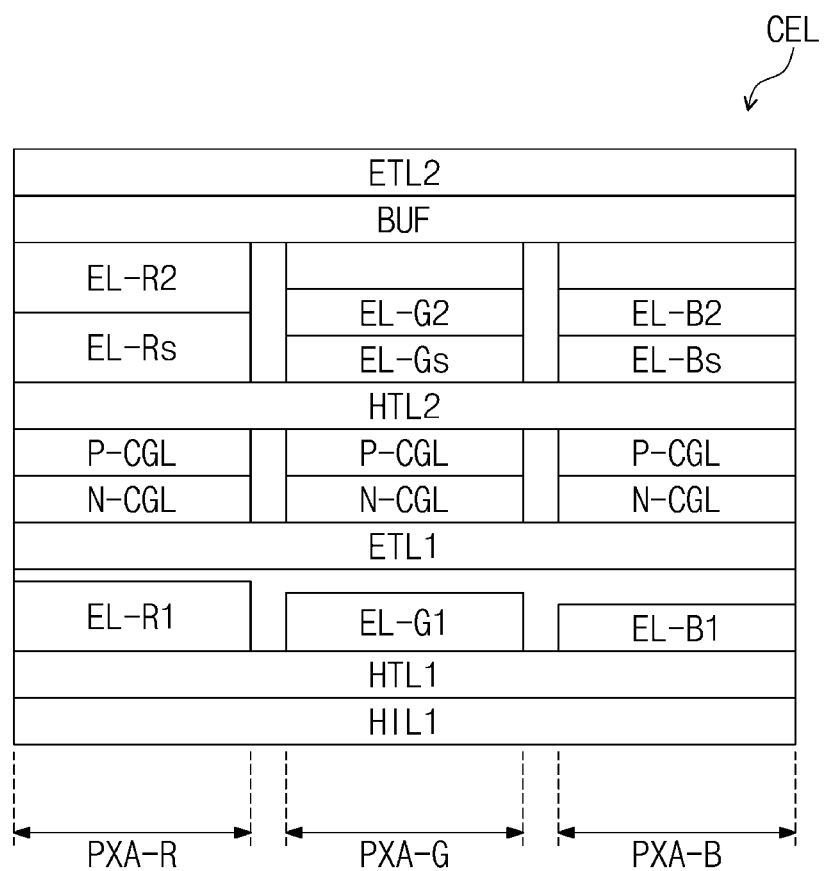
FIG. 3B is a cross-sectional view of an intermediate layer according to an embodiment of the present disclosure.

FIG. 3A is a cross-sectional view of the electronic device 1000 according to an embodiment of the present disclosure. FIG. 3B is a cross-sectional view of an intermediate layer CEL according to an embodiment of the present disclosure. For example, FIG. 3A may be a cross-sectional view taken along a line I-I' shown in FIG. 1.

Referring to FIG. 3A, the electronic device 1000 may include the display layer 100, the sensor layer 200, and an anti-reflection layer 300. The display layer 100 may include a base layer 110, a barrier layer 120, a buffer layer BFL, a circuit layer 130, an element layer 140, and an encapsulation layer 150.

The base layer 110 may have a single-layer or multi-layer structure. For example, the base layer 110 may include first to third sub-base layers 111, 112, and 113. Each of the first sub-base layer 111 and the third sub-base layer 113 may contain a polyimide-based resin, an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, and/or a perylene-based resin. Herein, a "~~"-based resin means a resin containing a functional group of "~~". For example, each of the first sub-base layer 111 and the third sub-base layer 113 may contain polyimide.

The second sub-base layer 112 may have a single-layer or multi-layer structure. For example, the second sub-base layer 112 may contain an inorganic material and may contain silicon oxide, silicon nitride, silicon oxynitride, and/or amorphous silicon. For example, the second sub-base layer 112 may contain the silicon oxynitride and the silicon oxide deposited thereon.

The barrier layer 120 may be disposed on the base layer 110. The barrier layer 120 may have a single-layer or multi-layer structure. The barrier layer 120 may contain the silicon oxide, the silicon nitride, the silicon oxynitride, and/or the amorphous silicon.

The barrier layer 120 may further include a first lower light blocking layer BML1. For example, when the barrier layer 120 has a multi-layer structure, the first lower light blocking layer BML1 may be disposed between layers constituting the barrier layer 120. However, the present disclosure might not necessarily be limited thereto, and the first lower light blocking layer BML1 may be disposed between the base layer 110 and the barrier layer 120 or may be disposed on the barrier layer 120. In one embodiment, the first lower light blocking layer BML1 may be omitted. The first lower light blocking layer BML1 may be referred to as a first lower layer, a first lower metal layer, a first lower electrode layer, a first lower shielding layer, a first light blocking layer, a first metal layer, a first shielding layer, or a first overlap layer.

The buffer layer BFL may be disposed on the barrier layer 120. The buffer layer BFL may prevent diffusion of metal atoms or impurities from the base layer 110 to a first semiconductor pattern. In addition, the buffer layer BFL may adjust a heat supply rate during a crystallization process for forming the first semiconductor pattern, so that the first semiconductor pattern is uniformly formed.

The buffer layer BFL may include a plurality of inorganic layers. For example, the buffer layer BFL may include a first sub-buffer layer containing the silicon nitride and a second sub-buffer layer disposed on the first sub-buffer layer and containing the silicon oxide.

The circuit layer 130 may be disposed on the buffer layer BFL, and the element layer 140 may be disposed on the circuit layer 130. A pixel PX may include a pixel circuit PDC and a light emitting element ED electrically connected to the pixel circuit PDC. The pixel circuit PDC may be included in the circuit layer 130 and the light emitting element ED may be included in the element layer 140.

FIG. 3A illustrates a silicon thin film transistor S-TFT and an oxide thin film transistor O-TFT of the pixel circuit PDC as an example. However, all transistors constituting the pixel circuit PDC may be the silicon thin film transistors S-TFT or the oxide thin film transistors O-TFT.

The first semiconductor pattern may be disposed on the buffer layer BFL. The first semiconductor pattern may contain a silicon semiconductor. For example, the silicon semiconductor may contain the amorphous silicon, polycrystalline silicon, and the like. For example, the first semiconductor pattern may contain low-temperature polysilicon.

FIG. 3A shows a portion of the first semiconductor pattern disposed on the buffer layer BFL, and the first semiconductor pattern may be further disposed in another area. The first semiconductor pattern may be arranged in a specific rule across the pixels. The first semiconductor pattern may have different electrical properties depending on whether it is doped or not. The first semiconductor pattern may include a first area having a high electrical conductivity and a second area having a low electrical conductivity. The first area may be doped with an N-type dopant or a P-type dopant. A P-type transistor may include a doped area doped with the P-type dopant, and an N-type transistor may include a doped area doped with the N-type dopant. The second area may be a non-doped area or a doped area with a lower concentration than the first area.

An electrical conductivity of the first area may be greater than that of the second area, and the first area may serve as an electrode or a signal line. The second area may substantially correspond to an active area (or a channel) of the transistor. For example, a portion of the first semiconductor pattern may be the active area of the transistor, another portion thereof may be a source or a drain of the transistor, and the other portion thereof may be a connection electrode or a connection signal line. FIG. 3A shows a portion of a connection signal line CSL formed from the first semiconductor pattern.

A source area SE1, an active area AC1, and a drain area DE1 of the silicon thin film transistor S-TFT may be formed from the first semiconductor pattern. The source area SE1 and the drain area DE1 may extend in opposite directions from an active area AC1 on a cross-section.

The circuit layer 130 may include a plurality of inorganic layers and a plurality of organic layers. In one embodiment, first to fifth insulating layers 10, 20, 30, 40, and 50 sequentially stacked on the buffer layer BFL may be inorganic layers, and sixth to eighth insulating layers 60, 70 and 80 may be organic layers.

The first insulating layer 10 may be disposed on the buffer layer BFL. The first insulating layer 10 may cover the first semiconductor pattern. The first insulating layer 10 may be the inorganic layer and/or the organic layer, and may have a single-layer or multi-layer structure. The first insulating layer 10 may contain aluminum oxide, titanium oxide, the silicon oxide, the silicon nitride, the silicon oxynitride, zirconium oxide, and/or hafnium oxide. In the present embodiment, the first insulating layer 10 may be a single-layer silicon oxide layer. In addition to the first insulating layer 10, the insulating layer of the circuit layer 130 to be described later may have a single-layer or multi-layer structure.

A gate electrode GT1 of the silicon thin film transistor S-TFT is disposed on the first insulating layer 10. The gate electrode GT1 may be a portion of a metal pattern. The gate electrode GT1 overlaps the active area AC1. In a process of doping the first semiconductor pattern, the gate electrode GT1 may function as a mask. The gate electrode GT1 may contain titanium, silver, an alloy containing the silver, molybdenum, an alloy containing the molybdenum, aluminum, an alloy containing the aluminum, aluminum nitride, tungsten, tungsten nitride, copper, indium tin oxide, indium zinc oxide, and the like, but might not be particularly limited thereto.

The second insulating layer 20 may be disposed on the first insulating layer 10 and may cover the gate electrode GT1. The second insulating layer 20 may be the inorganic layer and may have a single-layer or multi-layer structure. The second insulating layer 20 may contain the silicon oxide, the silicon nitride, and/or the silicon oxynitride. In the present embodiment, the second insulating layer 20 may have a single-layer structure including a silicon nitride layer.

The third insulating layer 30 may be disposed on the second insulating layer 20. The third insulating layer 30 may be the inorganic layer and may have a single-layer or multi-layer structure. For example, the third insulating layer 30 may have a multi-layer structure including a silicon oxide layer and a silicon nitride layer. One electrode Csta of a capacitor may be disposed between the second insulating layer 20 and the third insulating layer 30. In addition, the other electrode of the capacitor may be disposed between the first insulating layer 10 and the second insulating layer 20.

A second semiconductor pattern may be disposed on the third insulating layer 30. The second semiconductor pattern may contain an oxide semiconductor. The oxide semiconductor may include a plurality of areas classified based on whether the metal oxide is reduced. An area where the metal oxide is reduced (hereinafter, referred to as a reduced area) has a higher electrical conductivity than an area where the metal oxide is not reduced (hereinafter, referred to as a non-reduced area). The reduced area substantially serves as a source/drain of the transistor or a signal line. The non-reduced area substantially corresponds to an active area (or a semiconductor area or a channel) of the transistor. For example, a portion of the second semiconductor pattern may be the active area of the transistor, another portion may be a source/drain area of the transistor, and the other portion may be a signal transfer area.

A source area SE2, an active area AC2, and a drain area DE2 of the oxide thin film transistor O-TFT may be formed from the second semiconductor pattern. The source area SE2 and the drain area DE2 may extend in opposite directions from the active area AC2 on a cross-section.

The fourth insulating layer 40 may be disposed on the third insulating layer 30. The fourth insulating layer 40 may cover the second semiconductor pattern. The fourth insulating layer 40 may be the inorganic layer and may have a single-layer or multi-layer structure. The fourth insulating layer 40 may contain the aluminum oxide, the titanium oxide, the silicon oxide, the silicon nitride, the silicon oxynitride, the zirconium oxide, and/or the hafnium oxide. In the present embodiment, the fourth insulating layer 40 may have a single-layer structure containing the silicon oxide.

A gate electrode GT2 of the oxide thin film transistor O-TFT is disposed on the fourth insulating layer 40. The gate electrode GT2 may be a portion of the metal pattern. The gate electrode GT2 overlaps the active area AC2. In a process of reducing the second semiconductor pattern, the gate electrode GT2 may function as a mask.

A second lower light blocking layer BML2 may be disposed below the oxide thin film transistor O-TFT. The second lower light blocking layer BML2 may be disposed between the second insulating layer 20 and the third insulating layer 30. The second lower light blocking layer BML2 may contain the same material and may be formed via the same process as the one electrode Csta constituting the capacitor.

The fifth insulating layer 50 may be disposed on the fourth insulating layer 40 and may cover the gate electrode GT2. The fifth insulating layer 50 may be the inorganic layer and/or the organic layer, and may have a single-layer or multi-layer structure. For example, the fifth insulating layer 50 may have a multi-layer structure including the silicon oxide layer and the silicon nitride layer.

A first connection electrode CNE10 may be disposed on the fifth insulating layer 50. The first connection electrode CNE10 may be connected to the connection signal line CSL via a first contact hole CH1 extending through the first to fifth insulating layers 10, 20, 30, 40, and 50.

The sixth insulating layer 60 may be disposed on the fifth insulating layer 50. A second connection electrode CNE20 may be disposed on the sixth insulating layer 60. The second connection electrode CNE20 may be connected to the first connection electrode CNE10 via a second contact hole CH2 extending through the sixth insulating layer 60.

The seventh insulating layer 70 may be disposed on the sixth insulating layer 60 and may cover the second connection electrode CNE20.

A third connection electrode CNE30 may be disposed on the seventh insulating layer 70. The third connection electrode CNE30 may be connected to the second connection electrode CNE20 via a third contact hole CH3 extending through the seventh insulating layer 70. The eighth insulating layer 80 may be disposed on the seventh insulating layer 70 and may cover the third connection electrode CNE30.

The sixth insulating layer 60, the seventh insulating layer 70, and the eighth insulating layer 80 may be the organic layers. For example, each of the sixth insulating layer 60, the seventh insulating layer 70, and the eighth insulating layer 80 may contain a general purpose polymer such as benzocyclobutene (BCB), the polyimide, hexamethyldisiloxane (HMDSO), polymethylmethacrylate (PMMA), or polystyrene (PS), a polymer derivative having a phenolic group, an acrylic polymer, an imide-based polymer, an aryl ether-based polymer, an amide-based polymer, a fluorine-based polymer, a p-xylene-based polymer, a vinyl alcohol-based polymer, or a blend thereof.

The light emitting element ED may include a first electrode AE, the intermediate layer CEL, and a second electrode CE. The intermediate layer CEL has a multi-layer structure, and a detailed description thereof will be described later. Some of layers constituting the intermediate layer CEL and the second electrode CE may be commonly provided to the pixels PX. The first electrode AE may be referred to as a pixel electrode or an anode, and the second electrode CE may be referred to as a common electrode or a cathode.

The first electrode AE may be disposed on the eighth insulating layer 80. The first electrode AE may be connected to the third connection electrode CNE30 electrically connected to the pixel circuit PDC via a fourth contact hole CH4 extending through the eighth insulating layer 80.

In one embodiment of the present disclosure, the third connection electrode CNE30 may be omitted. In this case, the first electrode AE may pass through the seventh and eighth insulating layers 70 and 80 and be connected to the second connection electrode CNE20. In addition, in one embodiment of the present disclosure, the third connection electrode CNE30 and the eighth insulating layer 80 may be omitted. In this case, the first electrode AE may be disposed on the seventh insulating layer 70 and may pass through the seventh insulating layer 70 to be connected to the second connection electrode CNE20.

The first electrode AE may be a semi-transmissive electrode, a translucent electrode, or a reflective electrode. In one embodiment, the first electrode AE may include a reflective layer made of silver, magnesium, aluminum, platinum, palladium, gold, nickel, neodymium, iridium, chromium, or a compound thereof, and a transparent or translucent electrode layer formed on the reflective layer. The transparent or translucent electrode layer may contain indium tin oxide, indium zinc oxide, indium gallium zinc oxide, zinc oxide, indium oxide, and/or aluminum-doped zinc oxide. For example, the first electrode AE may include a multi-layer structure in which the indium tin oxide, the silver, and/or the indium tin oxide are sequentially stacked.

A pixel definition layer PDL may be disposed on the eighth insulating layer 80. The pixel definition layer PDL may have a property of absorbing light, and for example, the pixel definition layer PDL may have a black color. The pixel definition layer PDL may contain a black coloring agent. The black coloring agent may include a black dye and a black pigment. The black coloring agent may include carbon black, metal such as chromium, or oxide thereof.

An opening PDLop exposing a portion of the first electrode AE may be defined in the pixel definition layer PDL. For example, the pixel definition layer PDL may cover an edge of the first electrode AE. A light emitting area PXA may be defined by the pixel definition layer PDL.

A spacer HSPC may be disposed on the pixel definition layer PDL. A protruding spacer SPC may be disposed on the spacer HSPC. The spacer HSPC and the protruding spacer SPC may have an integral shape and may be made of the same material. For example, the spacer HSPC and the protruding spacer SPC may be formed via the same process using a halftone mask. However, this is an example and the present disclosure is not necessarily limited thereto. For example, the spacer HSPC and the protruding spacer SPC may contain different materials or may be formed by separate processes.

Referring to FIGS. 3A and 3B together, the plurality of light emitting areas PXAs may be provided, and the plurality of light emitting areas PXAs may include a first light emitting area PXA-R, a second light emitting area PXA-G, and a third light emitting area PXA-B. For example, the first light emitting area PXA-R may be a red light emitting area, the second light emitting area PXA-G may be a green light emitting area, and the third light emitting area PXA-B may be a blue light emitting area.

The intermediate layer CEL may be disposed on the first electrode AE. The intermediate layer CEL may include a first hole injection layer HIL1, a first hole transport layer HTL1, first light emitting layers EL-R1, EL-G1, and EL-B1, a first electron transport layer ETL1, charge generating layers N-CGL and P-CGL, a second hole transport layer HTL2, auxiliary layers EL-Rs, EL-Gs, and EL-Bs, second light emitting layers EL-R2, EL-G2, and EL-B2, a buffer layer BUF, and a second electron transport layer ETL2. However, this is an example, and some of the components included in the intermediate layer CEL may be omitted, and the intermediate layer CEL may further include other components.

The first hole injection layer HIL1 and the first hole transport layer HTL1 may be disposed over the first to third light emitting areas PXA-R, PXA-G, and PXA-B. The first light emitting layers EL-R1, EL-G1, and EL-B1 may be respectively disposed in the first to third light emitting areas PXA-R, PXA-G, and PXA-B corresponding thereto. The first light emitting layers EL-R1, EL-G1, and EL-B1 may contain organic, inorganic, or organic-inorganic materials that emit light of predetermined colors. The first electron transport layer ETL1 may be disposed on the first light emitting layers EL-R1, EL-G1, and EL-B1, and may be disposed over the first to third light emitting areas PXA-R, PXA-G, and PXA-B.

The charge generating layers N-CGL and P-CGL may include the first charge generating layers N-CGL and the second charge generating layers P-CGL. The first charge generating layers N-CGL may be organic layers containing the N-type dopants, and the second charge generating layers P-CGL may be organic layers containing the P-type dopants. The first charge generating layers N-CGL may be disposed on the first electron transport layer ETL1 and may be disposed in the first to third light emitting areas PXA-R, PXA-G, and PXA-B, respectively. The second charge generating layers P-CGL may be disposed on the first charge generating layers N-CGL, respectively.

The second hole transport layer HTL2 may be disposed on the second charge generating layers P-CGL, and may be disposed over the first to third light emitting areas PXA-R, PXA-G, and PXA-B. The auxiliary layers EL-Rs, EL-Gs, and EL-Bs may be disposed on the second hole transport layer HTL2, and may be disposed in the first to third light emitting areas PXA-R, PXA-G, and PXA-B, respectively. The auxiliary layers EL-Rs, EL-Gs, and EL-Bs may be layers serving to increase light emitting efficiencies of the dopant and the host. In addition, although not shown, auxiliary layers may be further disposed between the first hole transport layer HTL1 and the first light emitting layers EL-R1, EL-G1, and EL-B1.

The second light emitting layers EL-R2, EL-G2, and EL-B2 may be disposed on the auxiliary layers EL-Rs, EL-Gs, and EL-Bs, respectively. The buffer layer BUF may be disposed on the second light emitting layers EL-R2, EL-G2, and EL-B2. The second electron transport layer ETL2 may be disposed on the buffer layer BUF. The buffer layer BUF and the second electron transport layer ETL2 may be disposed over the first to third light emitting areas PXA-R, PXA-G, and PXA-B.

The second electrode CE may be disposed on the second electron transport layer ETL2. The second electrode CE may be disposed in a display area. The second electrode CE may be disposed over the first to third light emitting areas PXA-R, PXA-G, and PXA-B.

The element layer 140 may further include a capping layer CPL disposed on the second electrode CE. The capping layer CPL may serve to increase the light emitting efficiency by the principle of constructive interference. For example, the capping layer CPL may contain a material having a refractive index equal to or higher than 1.6 for light having a wavelength of 589 nm. The capping layer CPL may be an organic capping layer containing an organic material, an inorganic capping layer containing an inorganic material, or a composite capping layer containing the organic material and the inorganic material. For example, the capping layer may contain a carbocyclic compound, a heterocyclic compound, an amine group-containing compound, a porphine derivative, a phthalocyanine derivative, a naphthalocyanine derivative, an alkali metal complex, an alkaline earth metal complex, or any combinations thereof. The carbocyclic compound, the heterocyclic compound, and the amine group-containing compound may be optionally substituted with a substituent containing oxygen (O), nitrogen (N), sulfur (S), selenium (Se), silicon (Si), fluorine (F), chlorine (Cl), bromine (Br), iodine (I), or any combinations thereof.

The encapsulation layer 150 may be disposed on the element layer 140. The encapsulation layer 150 may include a first inorganic encapsulation layer 151, an organic encapsulation layer 152, and a second inorganic encapsulation layer 153 sequentially stacked. The first and second inorganic encapsulation layers 151 and 153 may protect the element layer 140 from moisture and oxygen, and the organic encapsulation layer 152 may protect the element layer 140 from foreign substances such as dust particles.

In one embodiment of the present disclosure, a low refraction layer may be further disposed between the capping layer CPL and the encapsulation layer 150. The low refraction layer may contain lithium fluoride. The low refraction layer may be formed by thermal evaporation.

The sensor layer 200 may be disposed on the display layer 100. The sensor layer 200 may be referred to as the sensor layer, an input sensor layer, or an input sensing panel. The sensor layer 200 may include a sensor base layer 201, a first sensor conductive layer 202, a sensor insulating layer 203, a second sensor conductive layer 204, and a sensor cover layer 205.

The sensor base layer 201 may be directly disposed on the display layer 100. The sensor base layer 201 may be an inorganic layer containing the silicon nitride, the silicon oxynitride, and/or the silicon oxide. Alternatively, the sensor base layer 201 may be an organic layer containing an epoxy resin, an acrylic resin, or an imide-based resin. The sensor base layer 201 may have a single-layer structure or a multi-layer structure of layers stacked along the third direction DR3.

Each of the first sensor conductive layer 202 and the second sensor conductive layer 204 may have a single-layer structure or a multi-layer structure of layers stacked along the third direction DR3.

The conductive layer of the single-layer structure may include a metal layer or a transparent conductive layer. The metal layer may contain molybdenum (Mo), silver (Ag), titanium (Ti), copper (Cu), aluminum (Al), or an alloy thereof. The transparent conductive layer may contain a transparent conductive oxide such as the indium tin oxide, the indium zinc oxide, zinc oxide, or indium zinc tin oxide. In addition, the transparent conductive layer may contain a conductive polymer such as poly(3,4-ethylenedioxythiophene) (PEDOT), a metal nanowire, graphene, and the like.

The conductive layer of the multi-layer structure may include metal layers. The metal layers may have, for example, a three-layer structure of titanium/aluminum/titanium. The conductive layer of the multi-layer structure may include at least one metal layer and at least one transparent conductive layer.

A width 204wt of a mesh line included in the second sensor conductive layer 204 may be greater than a width 202wt of a mesh line included in the first sensor conductive layer 202, but the present disclosure might not be particularly limited thereto.

The sensor insulating layer 203 may be disposed between the first sensor conductive layer 202 and the second sensor conductive layer 204. The sensor insulating layer 203 may include an inorganic film. The inorganic film may contain the aluminum oxide, the titanium oxide, the silicon oxide, the silicon nitride, the silicon oxynitride, the zirconium oxide, and/or the hafnium oxide.

Alternatively, the sensor insulating layer 203 may include an organic film. The organic film may contain the acrylic resin, a methacrylic resin, the polyisoprene, the vinyl-based resin, the epoxy-based resin, the urethane-based resin, the cellulose-based resin, the siloxane-based resin, the polyimide-based resin, the polyamide-based resin, and/or the perylene-based resin.

The sensor cover layer 205 may be disposed on the sensor insulating layer 203 and may cover the second sensor conductive layer 204. The second sensor conductive layer 204 may include a conductive pattern. The sensor cover layer 205 may cover the conductive pattern and may reduce or eliminate a probability of damage to the conductive pattern in a subsequent process. The sensor cover layer 205 may contain an inorganic material. For example, the sensor cover layer 205 may contain the silicon nitride, but might not be particularly limited thereto. In one embodiment of the present disclosure, the sensor cover layer 205 may be omitted.

The anti-reflection layer 300 may be disposed on the sensor layer 200. The anti-reflection layer 300 may include a divided layer 310, a plurality of color filters 320, and a planarization layer 330.

The divided layer 310 may overlap the conductive pattern of the second sensor conductive layer 204. The sensor cover layer 205 may be disposed between the divided layer 310 and the second sensor conductive layer 204. The divided layer 310 may prevent reflection of external light caused by the second sensor conductive layer 204. A material constituting the divided layer 310 is not necessarily particularly limited as long as it is a material that absorbs light. The divided layer 310 is a layer having the black color. In one embodiment, the divided layer 310 may contain the black coloring agent. The black coloring agent may include the black dye and the black pigment. The black coloring agent may include the carbon black, the metal such as the chromium, or the oxide thereof.

A dividing opening 310op may be defined in the divided layer 310. The dividing opening 310op may overlap the opening PDLop of the pixel definition layer PDL. The color filter 320 may correspond to the dividing opening 310op. The color filter 320 may transmit light provided from the intermediate layer CEL overlapping the color filter 320.

The planarization layer 330 may cover the divided layer 310 and the color filter 320. The planarization layer 330 may contain an organic material, and a flat surface may be provided at an upper surface of the planarization layer 330. In one embodiment, the planarization layer 330 may be omitted.

In one embodiment of the present disclosure, the anti-reflection layer 300 may include a reflection adjustment layer instead of the color filters 320. For example, in the illustration of FIG. 3A, the color filter 320 may be omitted, and the reflection adjustment layer may be added in a place where the color filter 320 is omitted. The reflection adjustment layer may selectively absorb light in a partial band of light reflected from inside a display panel and/or the electronic device or ambient light incident from outside the display panel and/or the electronic device.

For example, the reflection adjustment layer absorbs light of a first wavelength area in a range from 490 nm to 505 nm and a second wavelength area in a range from 585 nm to 600 nm, so that light transmittances in the first wavelength area and the second wavelength area may be equal to or lower than 40%. The reflection adjustment layer may absorb light with a wavelength outside wavelength ranges of red, green, and blue light emitted from the intermediate layer CEL. As described above, the reflection adjustment layer absorbs the light with the wavelength outside the wavelength ranges of the red, green, or blue light emitted from the intermediate layer CEL, thereby preventing or minimizing a decrease in luminance of the display panel and/or the electronic device. In addition, at the same time, deterioration in light emitting efficiencies of the display panel and/or the electronic device may be prevented or minimized, and visibility may be increased.

The reflection adjustment layer may be formed as an organic material layer containing a dye, a pigment, or a combination thereof. The reflection adjustment layer may contain a tetraazaporphyrin (TAP)-based compound, a porphyrin-based compound, a metal porphyrin-based compound, an oxazine-based compound, a squarylium-based compound, a triarylmethane-based compound, a polymethine-based compound, an anthraquinone-based compound, a phthalocyanine-based compound, an azo-based compound, a perylene-based compound, a xanthene-based compound, a diimmonium-based compound, a dipyrromethene-based compound, a cyanine-based compound, and combinations thereof.

In one embodiment, the reflection adjustment layer may have a light transmittance in a range from about 64% to 72%. The light transmittance of the reflection adjustment layer may be adjusted based on contents of the pigment and/or the dye contained in the reflection adjustment layer.

In one embodiment of the present disclosure, the anti-reflection layer 300 may include a phase retarder and/or a polarizer. The anti-reflection layer 300 may include at least a polarizing film. In this case, the anti-reflection layer 300 may be attached to the sensor layer 200 via an adhesive layer.

FIG. 4 is a plan view of the display layer 100 according to an embodiment of the present disclosure.

Referring to FIG. 4, a display area 100DA and a non-display area 100NDA adjacent to the display area 100DA may be defined in the display layer 100. First areas 100A1a and 100A1b and a second area 100A2 may be defined in the display area 100DA. The first areas 100A1a and 100A1b may be areas overlapping sensors. Accordingly, a light transmittance of each of the first areas 100A1a and 100A1b may be higher than that of the second area 100A2.

The light transmittances of the first areas 100A1a and 100A1b may be the equal to or different from each other. At least one of the first areas 100A1a and 100A1b may be referred to as the first area 100A1a and the other may be referred to as the third area 100A1b. Therefore, a first light transmittance of the first area 100A1a may be higher than a second light transmittance of the second area 100A2, a third light transmittance of the third area 100A1b may be higher than the second light transmittance of the second area 100A2, and the first light transmittance and the third light transmittance may be different from each other or may be equal to each other.

In FIG. 4, the two first areas 100A1a and 100A1b are provided as an example, but the present disclosure is not necessarily particularly limited thereto. For example, the one first area 100A1a or 100A1b may be defined or three or more first areas may be defined in the display area 100DA.

In one embodiment of the present disclosure, the first areas 100A1a and 100A1b might not display the image. To further increase the light transmittances of the first areas 100A1a and 100A1b, holes may be defined in the display layer 100 so as to correspond to the first areas 100A1a and 100A1b, respectively. For example, the holes may be defined by removing portions of the display layer 100 overlapping the first areas 100A1a and 100A1b, respectively. However, this is an example. Even when the first areas 100A1a and 100A1b do not display the image, the display layer 100 might not have the holes defined therein.

In one embodiment of the present disclosure, the first areas 100A1a and 100A1b and the second area 100A2 may display the image. A density or a shape of pixels arranged in the first areas 100A1a and 100A1b may be different from a density of pixels or a shape of the pixels arranged in the second area 100A2 such that the light transmittances of the first areas 100A1a and 100A1b are higher than the light transmittance of the second area 100A2.

Figure 5:
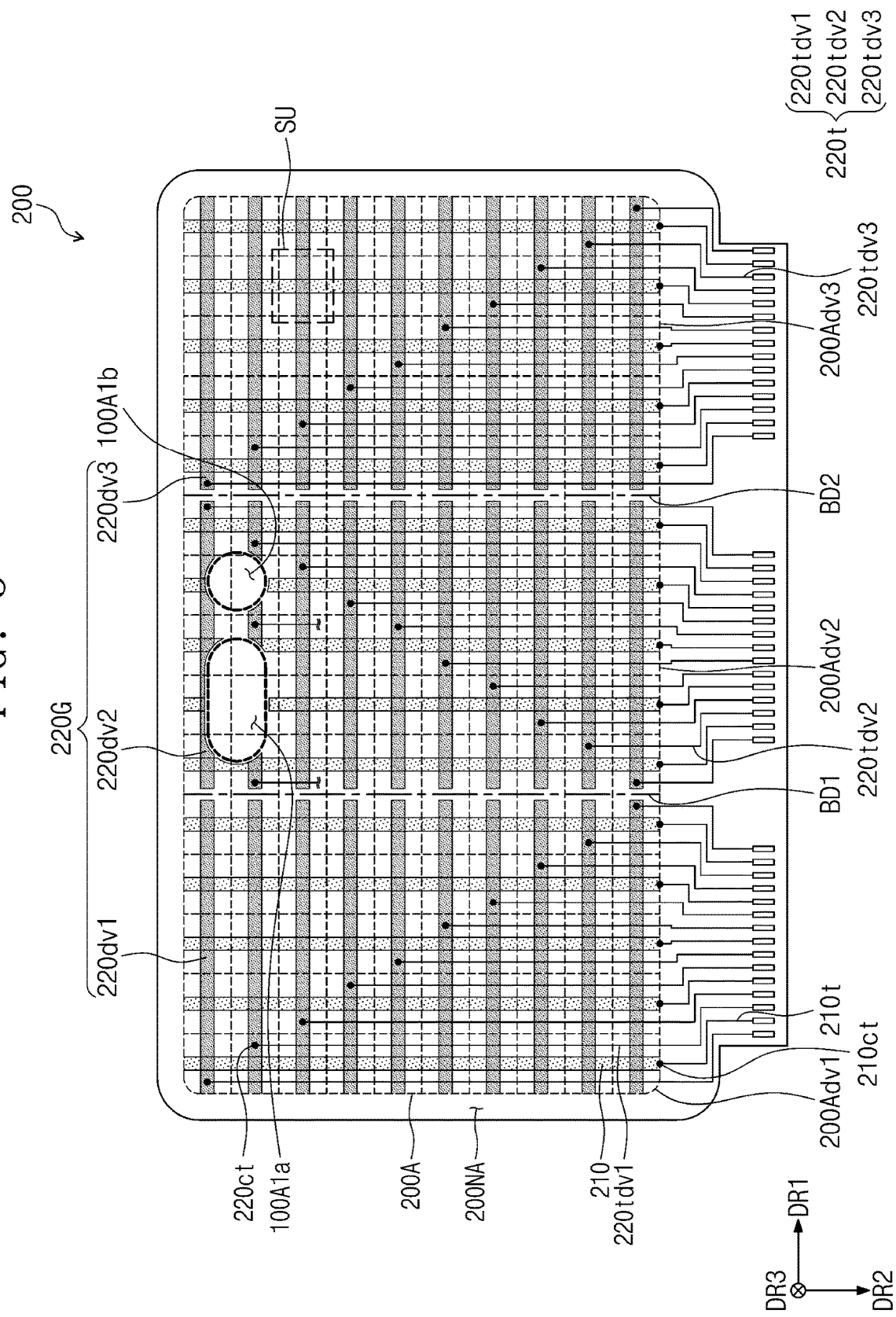
FIG. 5 is a plan view of a sensor layer according to an embodiment of the present disclosure.

FIG. 5 is a plan view of the sensor layer 200 according to an embodiment of the present disclosure.

Referring to FIGS. 4 and 5, a sensing area 200A and a peripheral area 200NA adjacent to the sensing area 200A may be defined in the sensor layer 200. The sensing area 200A may overlap the display area 100DA, and the peripheral area 200NA may overlap the non-display area 100NDA.

The sensor layer 200 may include a plurality of first electrodes 210 and a plurality of second electrode groups 220G disposed in the sensing area 200A. The first electrodes 210 may be arranged along the first direction DR1, and the second electrode groups 220G may be arranged along the second direction DR2 intersecting the first direction DR1. Each of the first electrodes 210 may extend along the second direction DR2, and each of the first electrodes 210 may intersect the second electrode groups 220G. Each of the second electrode groups 220G may extend along the first direction DR1, and each of the second electrode groups 220G may intersect the first electrodes 210. In FIG. 5, a shape of each of the first electrodes 210 and the second electrode groups 220G is shown as a bar shape, but the shape of each of the first electrodes 210 and the second electrode groups 220G is not necessarily limited thereto.

Although the 15 first electrodes 210 and the 10 second electrode groups 220G are shown as an example in FIG. 5, the number of each of the first electrodes 210 and the second electrode groups 220G is not necessarily particularly limited thereto. For example, the number of first electrodes 210 and the number of second electrode groups 220G may be variously changed based on an aspect ratio of the electronic device 1000 (see FIG. 1).

A plurality of sensing units SU may be defined in the sensor layer 200. Each of the sensing units SU may correspond to an area where one of the first electrodes 210 and one of the second electrode groups 220G intersect each other. In FIG. 5, the 150 sensing units SU are defined in the sensor layer 200 as an example, but the number of sensing units SU may be changed based on the number of first electrodes 210 and the number of second electrode groups 220G.

According to one embodiment of the present disclosure, boundaries BD1 and BD2 extending along the second direction DR2 may be defined in the sensing area 200A of the sensor layer 200. The boundaries BD1 and BD2 may be divided driving boundary lines. Accordingly, the sensing area 200A may include a plurality of first to third divided driving areas 200Adv1, 200Adv2, and 200Adv3 divided by the boundaries BD1 and BD2. The plurality of first to third divided driving areas 200Adv1, 200Adv2, and 200Adv3 may be adjacent to each other in the first direction DR1.

When a width in the first direction DR1 of the sensing area 200A increases by the aspect ratio of the electronic device 1000 (see FIG. 1) and the second electrode group 220G is composed of one second electrode, a load of the second electrode may be increased. In this case, to reduce the load of the second electrode, the second electrode group 220G may include a plurality of second electrodes spaced apart from each other in the first direction DR1. For example, each of the second electrode groups 220G may include the first divided electrode 220$dv$1, the second divided electrode 220$dv$2, and the third divided electrode 220$dv$3.

The first divided electrode 220$dv$1 may overlap the first divided driving area 200Adv1, the second divided electrode 220$dv$2 may overlap the second divided driving area 200Adv2, and the third divided electrode 220$dv$3 may overlap the third divided driving area 200Adv3. The first divided electrodes 220$dv$1, the second divided electrodes 220$dv$2, and the third divided electrodes 220$dv$3 of the second electrode groups 220G may be arranged along the second direction DR2.

The sensor layer 200 may further include a plurality of first trace lines 210$t$ electrically connected to the first electrodes 210 and a plurality of second trace lines 220$t$ electrically connected to the second electrode groups 220G.

In one embodiment of the present disclosure, the second trace lines 220$t$ may overlap the sensing area 200A. For example, the second trace lines 220$t$ might not be disposed in the peripheral area 200NA adjacent to the sensing area 200A in the first direction DR1. Accordingly, an area size of the peripheral area 200NA may be reduced. As a result, an area size occupied by the non-display area 1000NA (see FIG. 1) on a front surface of the electronic device 1000 (see FIG. 1) may be reduced, and a narrow bezel may be implemented.

In addition, in one embodiment of the present disclosure, when each of the second electrode groups 220G is divided into three or more divided electrodes, in particular, divided electrodes (e.g., the second divided electrode 220$dv$2) spaced apart from the peripheral area 200NA may be electrically connected to the second trace lines 220$t$ extending to overlap the sensing area 200A.

The first electrodes 210 and the first trace lines 210$t$ may be respectively connected to each other via a plurality of first contacts 210$ct$. Second electrodes 220 and the second trace lines 220$t$ may be respectively connected to each other via a plurality of second contacts 220$ct$. In one embodiment of the present disclosure, the first contacts 210$ct$ may overlap the peripheral area 200NA, and the second contacts 220$ct$ may overlap the sensing area 200A. However, the present disclosure is not necessarily particularly limited thereto. For example, both the first contacts 210$ct$ and the second contacts 220$ct$ may overlap the sensing area 200A. In this case, at least portions of the first trace lines 210$t$ may overlap the sensing area 200A.

The second trace lines 220$t$ may include first divided trace lines 220$tdv$1 electrically connected to the first divided electrodes 220$dv$1, second divided trace lines 220$tdv$2 electrically connected to the second divided electrodes 220$dv$2, and third divided trace lines 220$tdv$3 electrically connected to the third divided electrodes 220$dv$3.

In one embodiment of the present disclosure, the first areas 100A1$a$ and 100A1$b$ of the display layer 100 may overlap the second divided driving area 200Adv2. In this case, at least one of the second divided electrodes 220$dv$2 adjacent to the first areas 100A1$a$ and 100A1$b$ may include electrically separated sub-electrodes. The number of second divided trace lines 220$tdv$2 may be equal to or greater than the number of first divided trace lines 220$tdv$1 to electrically connect the sub-electrodes to each other. A detailed description of therefor will be described later.

Figure 6:
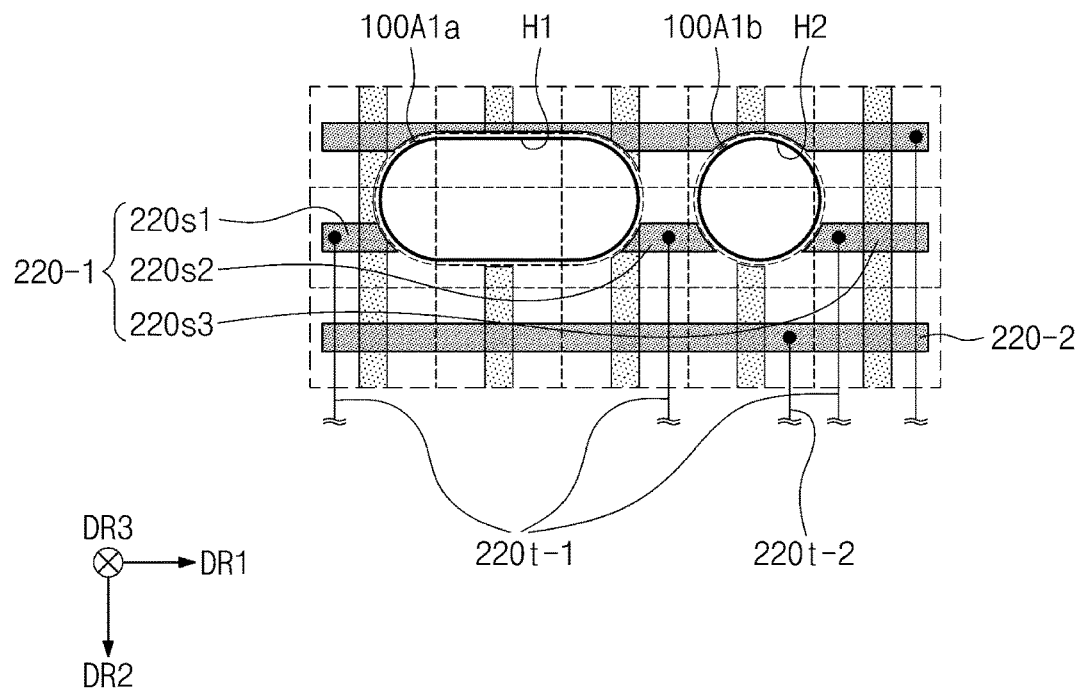
FIG. 6 is an enlarged plan view of a portion of a sensor layer according to an embodiment of the present disclosure.

FIG. 6 is an enlarged plan view of a portion of the sensor layer 200 (see FIG. 5) according to an embodiment of the present disclosure.

Referring to FIGS. 4, 5, and 6, the second electrode groups 220G may include a first-second electrode 220-1 and a second-second electrode 220-2. The first-second electrode 220-1 may be adjacent to the first areas 100A1$a$ and 100A1$b$, and the second-second electrode 220-2 may be spaced apart from the first areas 100A1$a$ and 100A1$b$. For example, the first-second electrode 220-1 and the second-second electrode 220-2 may be spaced apart from each other in the second direction DR2.

In one embodiment of the present disclosure, first and second holes H1 and H2 may be defined in the sensor layer 200 to correspond to the first areas 100A1$a$ and 100A1$b$, respectively. For example, each of the first and second holes H1 and H2 may be defined by removing portions of the display layer 100 and the sensor layer 200. Accordingly, the first-second electrode 220-1 adjacent to the first areas 100A1$a$ and 100A1$b$ may include a plurality of sub-electrodes 220$s$1, 220$s$2, and 220$s$3 separated from each other. For example, the first-second electrode 220-1 may include the first sub-electrode 220$s$1, the second sub-electrode 220$s$2 spaced apart from the first sub-electrode 220$s$1 with the first hole H1 interposed therebetween, and the third sub-electrode 220$s$3 spaced apart from the second sub-electrode 220$s$2 with the second hole H2 interposed therebetween.

The second trace lines 220$t$ may include first-second trace lines 220$t$-1 and second-second trace lines 220$t$-2. The first-second trace lines 220$t$-1 may be electrically connected to the first-second electrode 220-1, and the second-second trace line 220$t$-2 may be electrically connected to the second-second electrode 220-2. The first-second trace lines 220$t$-1 may be electrically connected to the first to third sub-electrodes 220$s$1, 220$s$2, and 220$s$3 in a one-to-one correspondence, respectively. Accordingly, the number of first-second trace lines 220$t$-1 may be greater than the number of second-second trace lines 220$t$-2. In the embodiment shown in FIG. 6, the number of first-second trace lines 220$t$-1 may be three, and the number of second-second trace lines 220$t$-2 may be one.

According to one embodiment of the present disclosure, as the sub-electrodes 220$s$1, 220$s$2, and 220$s$3 spaced apart from each other are connected to the first-second trace lines 220*t*-1 in the one-to-one correspondence, lines for connecting the sub-electrodes 220*s*1, 220*s*2, and 220*s*3 to each other may be omitted. For example, as the lines are omitted, the first-second electrode 220-1 may extend to an area adjacent to the first and second holes H1 and H2. Accordingly, a sensing sensitivity of the sensor layer 200 may be increased.

In one embodiment of the present disclosure, the first areas 100A1*a* and 100A1*b* may overlap the second divided driving area 200Adv2. Therefore, the first-second electrode 220-1 and the second-second electrode 220-2 may be one and another of the second divided electrodes 220*dv*2, and the first-second trace lines 220*t*-1 and the second-second trace line 220*t*-2 may be some of the second divided trace lines 220*tdv*2.

According to one embodiment of the present disclosure, as the first-second electrode 220-1 includes the plurality of sub-electrodes 220*s*1, 220*s*2, and 220*s*3 spaced apart from each other, the number of second divided trace lines 220*tdv*2 may be increased. Therefore, the number of second divided trace lines 220*tdv*2 may be greater than the number of first divided trace lines 220*tdv*1.

Figure 7:
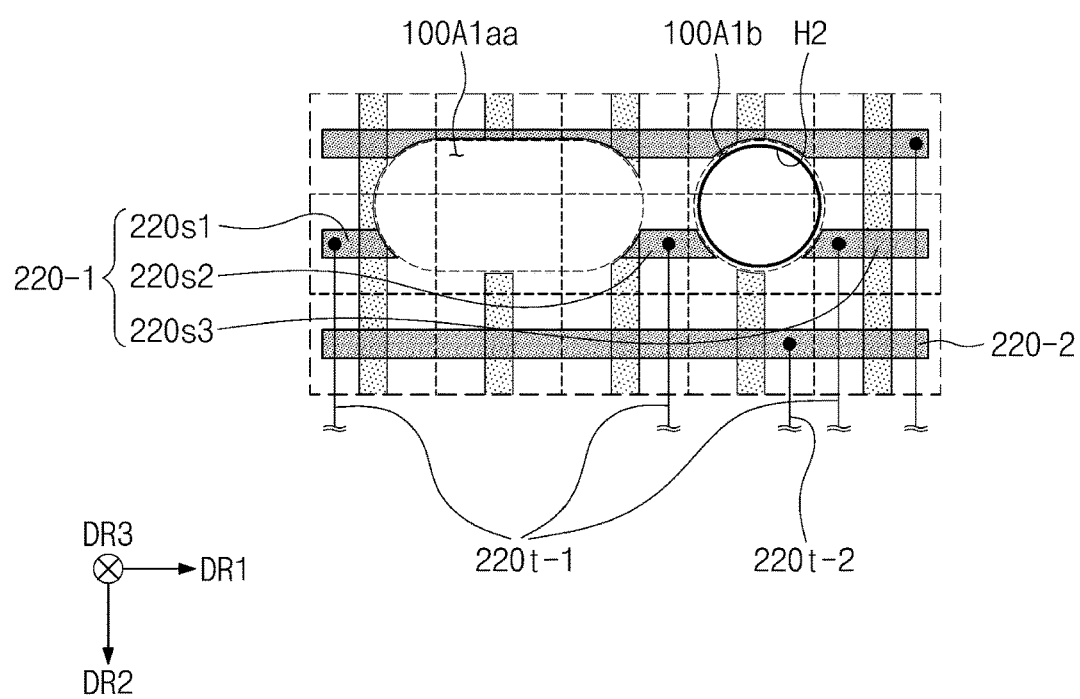
FIG. 7 is an enlarged plan view of a portion of a sensor layer according to an embodiment of the present disclosure.

FIG. 7 is an enlarged plan view of a portion of the sensor layer 200 (see FIG. 5) according to an embodiment of the present disclosure. In a description of FIG. 7, the same reference numerals are given to the components described in FIG. 6, and to the extent that an element is not described in detail with respect to this figure, it may be understood that the element is at least similar to a corresponding element described herein with reference to another figure.

Referring to FIGS. 4, 5, and 7, one first area 100A1*aa* of first areas 100A1*aa* and 100A1*b* may display the image, and the other first area 100A1*b* might not display the image. In addition, the second hole H2 obtained by removing the portions of the display layer 100 and the sensor layer 200 may be defined in the first area 100A1*b*.

In one embodiment of the present disclosure, to increase a light transmittance of the first area 100A1*aa*, first and second sensor conductive layers 202 and 204 (see FIG. 3A) might not be disposed in the first area 100A1*aa*. Accordingly, the first-second electrode 220-1 adjacent to the first areas 100A1*aa* and 100A1*b* may include the plurality of sub-electrodes 220*s*1, 220*s*2, and 220*s*3 spaced apart from each other.

The first-second trace lines 220*t*-1 may be electrically connected to the first to third sub-electrodes 220*s*1, 220*s*2, and 220*s*3 in the one-to-one correspondence, respectively. Accordingly, the lines for connecting the sub-electrodes 220*s*1, 220*s*2, and 220*s*3 to each other may be omitted. For example, as the lines are omitted, an area size of the first-second electrode 220-1 may be extended to the first area 100A1*aa* and an area adjacent to the second hole H2. Accordingly, the sensing sensitivity of the sensor layer 200 may be increased.

Figure 8:
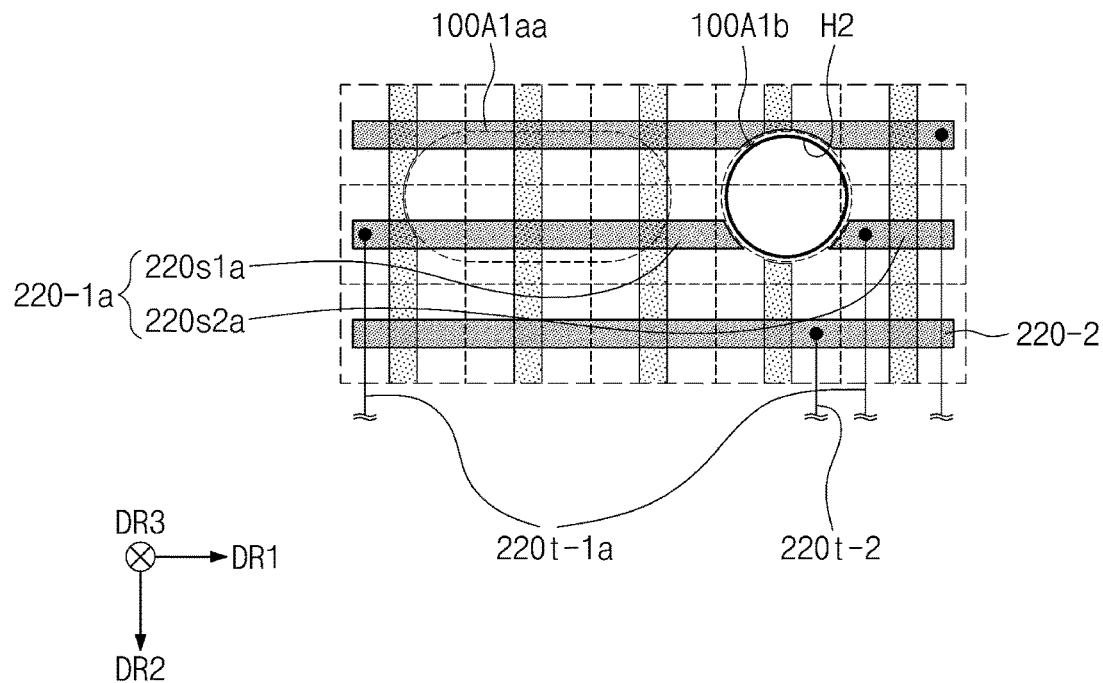
FIG. 8 is an enlarged plan view of a portion of a sensor layer according to an embodiment of the present disclosure.

FIG. 8 is an enlarged plan view of a portion of the sensor layer 200 (see FIG. 5) according to an embodiment of the present disclosure. In a description of FIG. 8, the same reference numerals are given to the components described in FIG. 6, and to the extent that an element is not described in detail with respect to this figure, it may be understood that the element is at least similar to a corresponding element described herein with reference to another figure.

Referring to FIGS. 4, 5, and 8, the one first area 100A1*aa* of the first areas 100A1*aa* and 100A1*b* may display the image, and the other first area 100A1*b* might not display the image.

In one embodiment of the present disclosure, the first and second sensor conductive layers 202 and 204 (see FIG. 3A) may be disposed in the first area 100A1*a*. Accordingly, a first-second electrode 220-1*a* may overlap the first area 100A1*aa*. However, to increase the light transmittance of the first area 100A1*aa*, an arrangement density (hereinafter, referred to as a first density) of a mesh line of a portion of the first-second electrode 220-1*a* overlapping the first area 100A1*aa* and an arrangement density (hereinafter, referred to as a second density) of a mesh line of a portion of the first-second electrode 220-1*a* not overlapping the first area 100A1*aa* may be different from each other. For example, the first density may be smaller than the second density.

The first-second electrode 220-1*a* may include a plurality of sub-electrodes 220*s*1*a* and 220*s*2*a* spaced apart from each other. First-second trace lines 220*t*-1*a* may be electrically connected to the sub-electrodes 220*s*1*a* and 220*s*2*a* in a one-to-one correspondence, respectively. Accordingly, lines for connecting the sub-electrodes 220*s*1*a* and 220*s*2*a* to each other may be omitted. For example, as the lines are omitted, an area size of the first-second electrode 220-1*a* may be extended to the area adjacent to the second hole H2. Accordingly, the sensing sensitivity of the sensor layer 200 may be increased.

Figure 9:
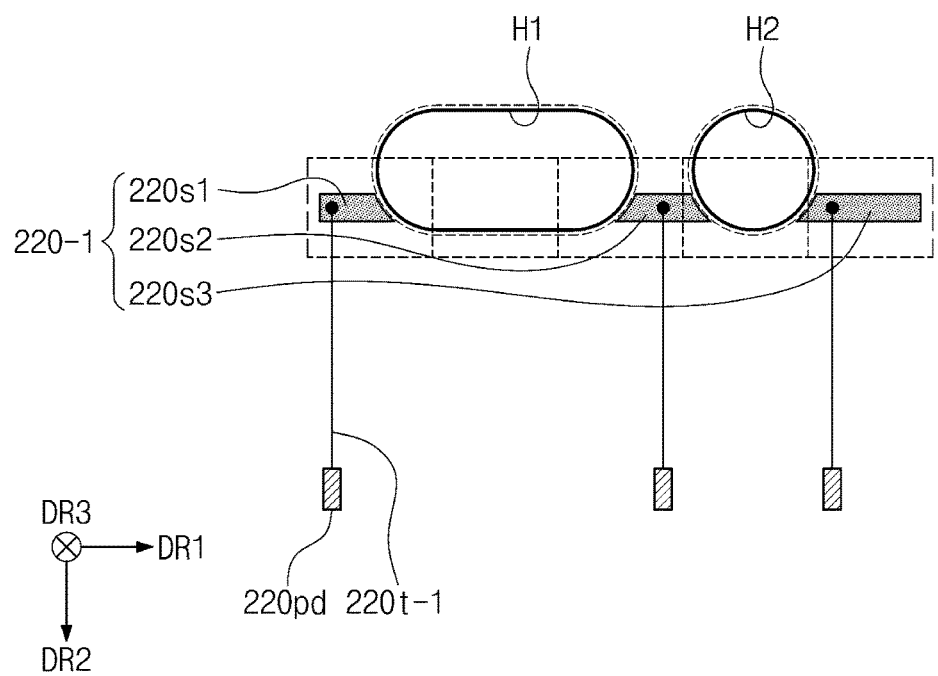
FIG. 9 is a diagram showing some components of a sensor layer according to an embodiment of the present disclosure.

FIG. 9 is a diagram showing some components of the sensor layer 200 (see FIG. 5) according to an embodiment of the present disclosure.

Referring to FIGS. 5 and 9, the first-second electrode 220-1, the first-second trace lines 220*t*-1, and a plurality of pads 220*pd* are illustrated. According to one embodiment of the present disclosure, the first-second trace lines 220*t*-1 may be connected to the plurality of pads 220*pd* in a one-to-one correspondence, respectively. Accordingly, the number of first-second trace lines 220*t*-1 and the number of pads 220*pd* may be equal to each other.

In one embodiment of the present disclosure, the sensor driver 200C (see FIG. 2) may include one or more touch driving chips. Because the first-second trace lines 220*t*-1 are connected to the plurality of pads 220*pd* in the one-to-one correspondence, respectively, the first to third sub-electrodes 220*s*1, 220*s*2, and 220*s*3 included in the first-second electrode 220-1 may be may be connected to the same touch driving chip or to different touch driving chips.

Figure 10:
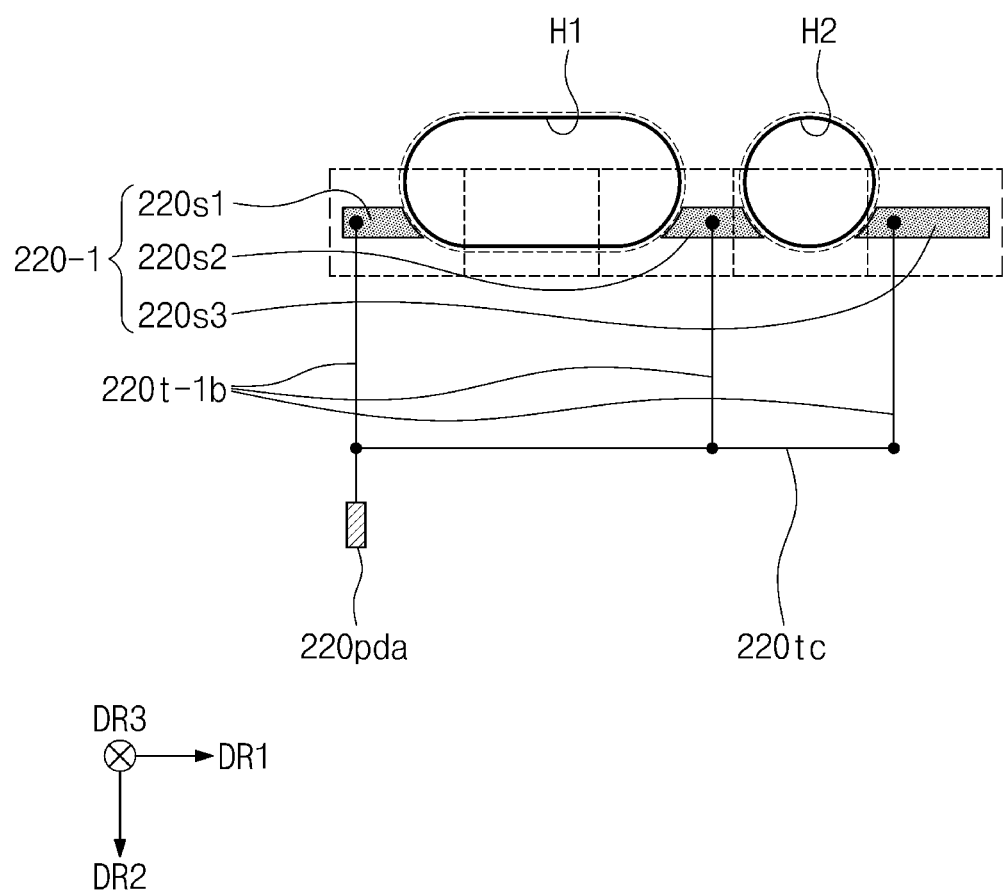
FIG. 10 is a diagram showing some components of a sensor layer according to an embodiment of the present disclosure.

FIG. 10 is a diagram showing some components of the sensor layer 200 (see FIG. 5) according to an embodiment of the present disclosure.

Referring to FIG. 10, the first-second electrode 220-1, first-second trace lines 220*t*-1*b*, and one pad 220*pda* are shown. According to one embodiment of the present disclosure, the first-second trace lines 220*t*-1*b* may be connected to the one pad 220*pda*. Accordingly, the number of first-second trace lines 220*t*-1*b* may be greater than the number of pads 220*pda*.

According to one embodiment of the present disclosure, the sensor layer 200 may include a connection portion 220*tc* for connecting the first-second trace lines 220*t*-1*b* to each other. The connection portion 220*tc* may be provided to overlap the sensing area 200A or may be provided to overlap the peripheral area 200NA.

Figure 11:
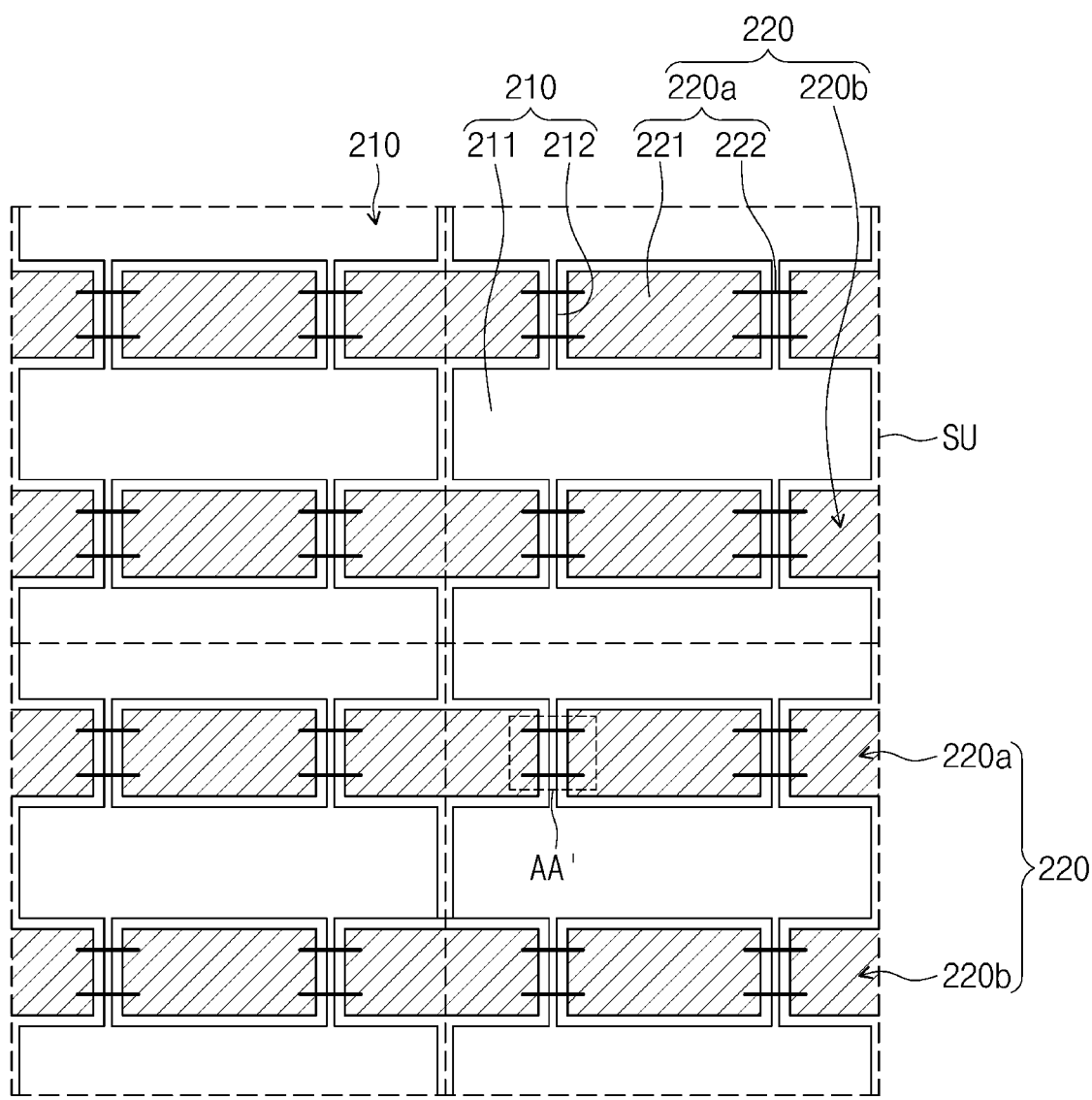
FIG. 11 is a plan view showing sensing units of a sensor layer according to an embodiment of the present disclosure.

FIG. 11 is a plan view showing the sensing units SU of the sensor layer 200 (see FIG. 5) according to an embodiment of the present disclosure.

Referring to FIGS. 5 and 11, the four sensing units SU adjacent to each other in the first direction DR1 and the second direction DR2 are shown as an example.

Each of the four sensing units SU may include a portion of the one first electrode 210 and a portion of the one second electrode 220. The one second electrode 220 may be one of the first to third divided electrodes 220*dv*1, 220*dv*2, and 220*dv*3 included in the second electrode groups 220G.

The first electrode 210 may include a sensing portion 211 and a bridge portion 212. The sensing portion 211 and the bridge portion 212 may be integrated with each other and may be disposed on the same layer. The sensing portion 211 may be referred to as a pattern portion or a first portion, and the bridge portion 212 may be referred to as a connection portion or a second portion.

The second electrode 220 may include a first sub-divided electrode 220*a* and a second sub-divided electrode 220*b* spaced apart from each other in the second direction DR2 and extending along the first direction DR1. The first sub-divided electrode 220*a* and the second sub-divided electrode 220*b* may constitute one channel. In FIG. 11, the one second electrode 220 includes the two sub-divided electrodes 220*a* and 220*b* as an example, but the number is not necessarily limited thereto.

Each of the first and second sub-divided electrodes 220*a* and 220*b* may include sensing patterns 221 and bridge patterns 222 disposed on a layer different from that of the sensing patterns 221. The sensing patterns 221 may be spaced apart from each other in the first direction DR1, and the bridge patterns 222 may electrically connect the adjacent sensing patterns 221 to each other. In FIG. 11, the two adjacent sensing patterns 221 are electrically connected to each other by the two bridge patterns 222, but the present disclosure is not necessarily particularly limited thereto.

The sensing portion 211, the bridge portion 212, and the sensing pattern 221 may be disposed on the same layer. The bridge patterns 222 may be disposed on a layer different from that of the sensing portion 211, the bridge portion 212, and the sensing pattern 221. For example, the sensing portion 211, the bridge portion 212, and the sensing pattern 221 may be components included in the second sensor conductive layer 204 (see FIG. 3A), and the bridge patterns 222 may be a component included in the first sensor conductive layer 202 (see FIG. 3A). In this case, the sensor layer 200 has a structure in which the bridge patterns 222 are arranged closer to the display layer 100 than the sensing patterns 221. Accordingly, the sensor layer 200 may have a bottom bridge structure. However, this is an example, and the present disclosure is not necessarily limited thereto. The sensing portion 211, the bridge portion 212, and the sensing pattern 221 may be components included in the first sensor conductive layer 202 (see FIG. 3A), and the bridge patterns 222 may be a component included in the second sensor conductive layer 204 (see FIG. 3A). In this case, the sensor layer 200 may have a top bridge structure.

Figure 12:
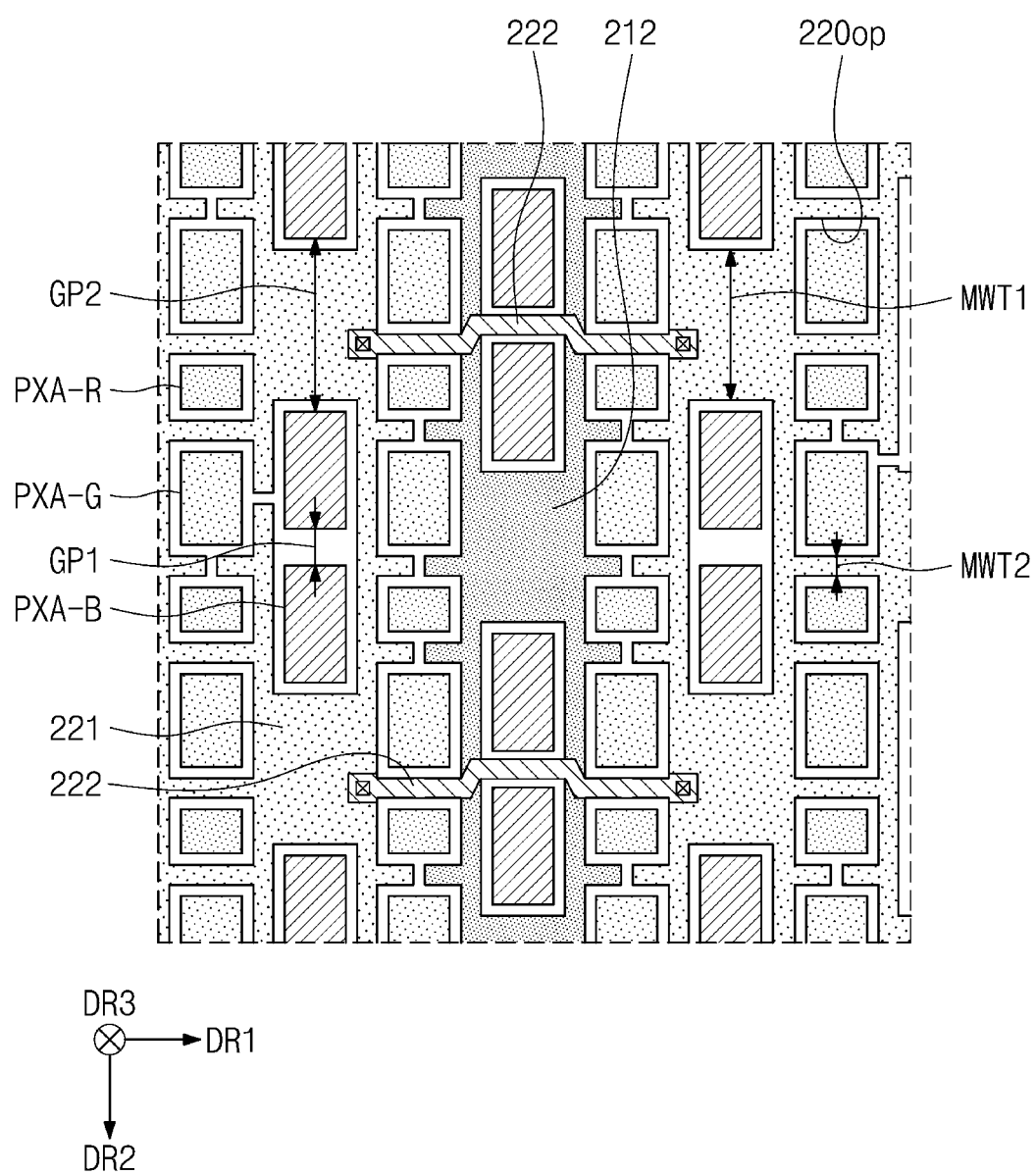
FIG. 12 is an enlarged plan view of a portion of an electronic device according to an embodiment of the present disclosure.

FIG. 12 is an enlarged plan view of a portion of the electronic device 1000 (see FIG. 1) according to an embodiment of the present disclosure. For example, FIG. 12 is a plan view illustrating an enlarged portion of an electronic device including an area AA' shown in FIG. 11.

Referring to FIGS. 11 and 12, the sensing portion 211, the bridge portion 212, and the sensing pattern 221 may have a mesh shape. FIG. 12 representatively shows a portion of the bridge portion 212 and a portion of the sensing pattern 221. A plurality of openings 220*op* may be defined in the bridge portion 212 and the sensing pattern 221. The plurality of openings 220*op* may overlap the first light emitting area PXA-R, the second light emitting area PXA-G, and the third light emitting area PXA-B. The sensing portion 211, the bridge portion 212, the sensing pattern 221, and the bridge patterns 222 might not overlap the first light emitting area PXA-R, the second light emitting area PXA-G, and the third light emitting area PXA-B.

In one embodiment of the present disclosure, the first to third light emitting areas PXA-R, PXA-G, and PXA-B may include the plurality of first light emitting areas PXA-R, the plurality of second light emitting areas PXA-G, and the plurality of third light emitting areas PXA-B, respectively. Each of the first light emitting area PXA-R and each of the second light emitting area PXA-G may be alternately arranged along the second direction DR2 in a repeated manner. The third light emitting areas PXA-B may be arranged along the second direction DR2. For example, the third light emitting areas PXA-B may be arranged to be spaced apart from each other with alternating first spacing GP1 and second spacing GP2 greater than the first spacing GP1.

In one embodiment of the present disclosure, the sensing portion 211, the bridge portion 212, and the sensing pattern 221 might not be disposed between the third light emitting areas PXA-B spaced apart from each other with the first spacing GP1. A width MWT1 of mesh lines of the sensing portion 211, the bridge portion 212, and the sensing pattern 221 disposed between the third light emitting areas PXA-B spaced apart from each other with the second spacing GP2 may be greater than a width MWT2 of a mesh line disposed between the first light emitting area PXA-R and the second light emitting area PXA-G. The bridge patterns 222 may be disposed between the third light emitting areas PXA-B spaced apart from each other with the first spacing GP1.

Figure 13A:
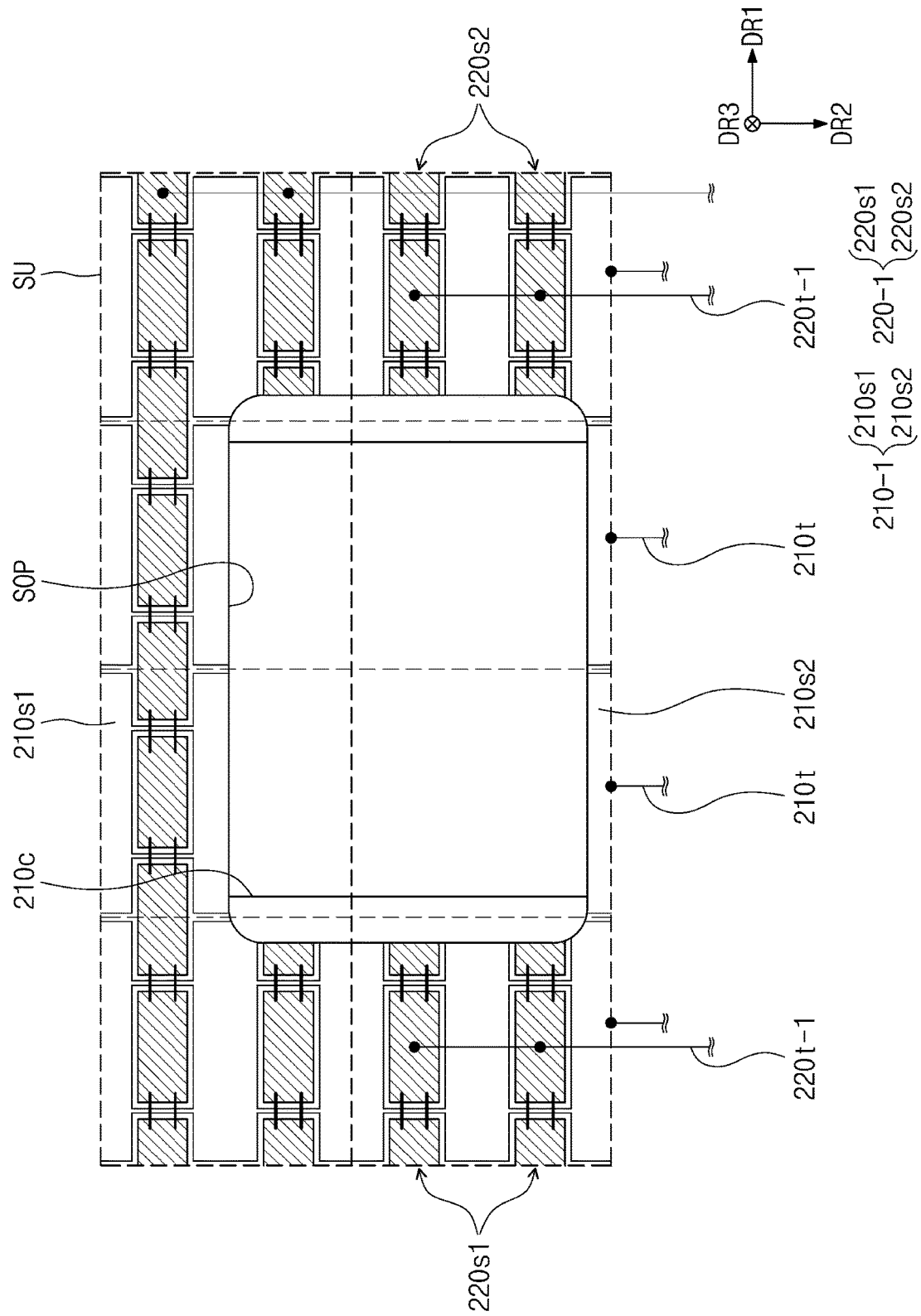
FIG. 13A is an enlarged plan view of a portion of a sensor layer according to an embodiment of the present disclosure.

FIG. 13A is an enlarged plan view of a portion of the sensor layer 200 (see FIG. 5) according to an embodiment of the present disclosure.

Referring to FIGS. 5 and 13A, an opening SOP provided in the sensor layer 200 and the 8 sensing units SU adjacent thereto are illustrated as examples. The opening SOP may be defined by removing an entirety of the sensor layer 200, or by removing the first and second sensor conductive layers 202 and 204 (see FIG. 3A) among the components of the sensor layer 200. An overlapping area of the display layer 100 (see FIG. 4) overlapping the opening SOP may or might not display the image. When the overlapping area does not display the image, a hole where a portion corresponding to the opening SOP is removed may be defined in the display layer 100.

The first sub-electrode 220*s*1 of the first-second electrode 220-1 and the second sub-electrode 220*s*2 of the first-second electrode 220-1 spaced apart from each other with the opening SOP interposed therebetween may be connected to the first-second trace lines 220*t*-1, respectively. A first sub-electrode 210*s*1 of a first electrode 210-1 and a second sub-electrode 210*s*2 of the first electrode 210-1 spaced apart from each other with the opening SOP interposed therebetween may be electrically connected to each other by a connection line 210*c*. The connection line 210*c* may electrically connect the first sub-electrode 210*s*1 and the second sub-electrode 210*s*2 to each other via the opening SOP.

Figure 13B:
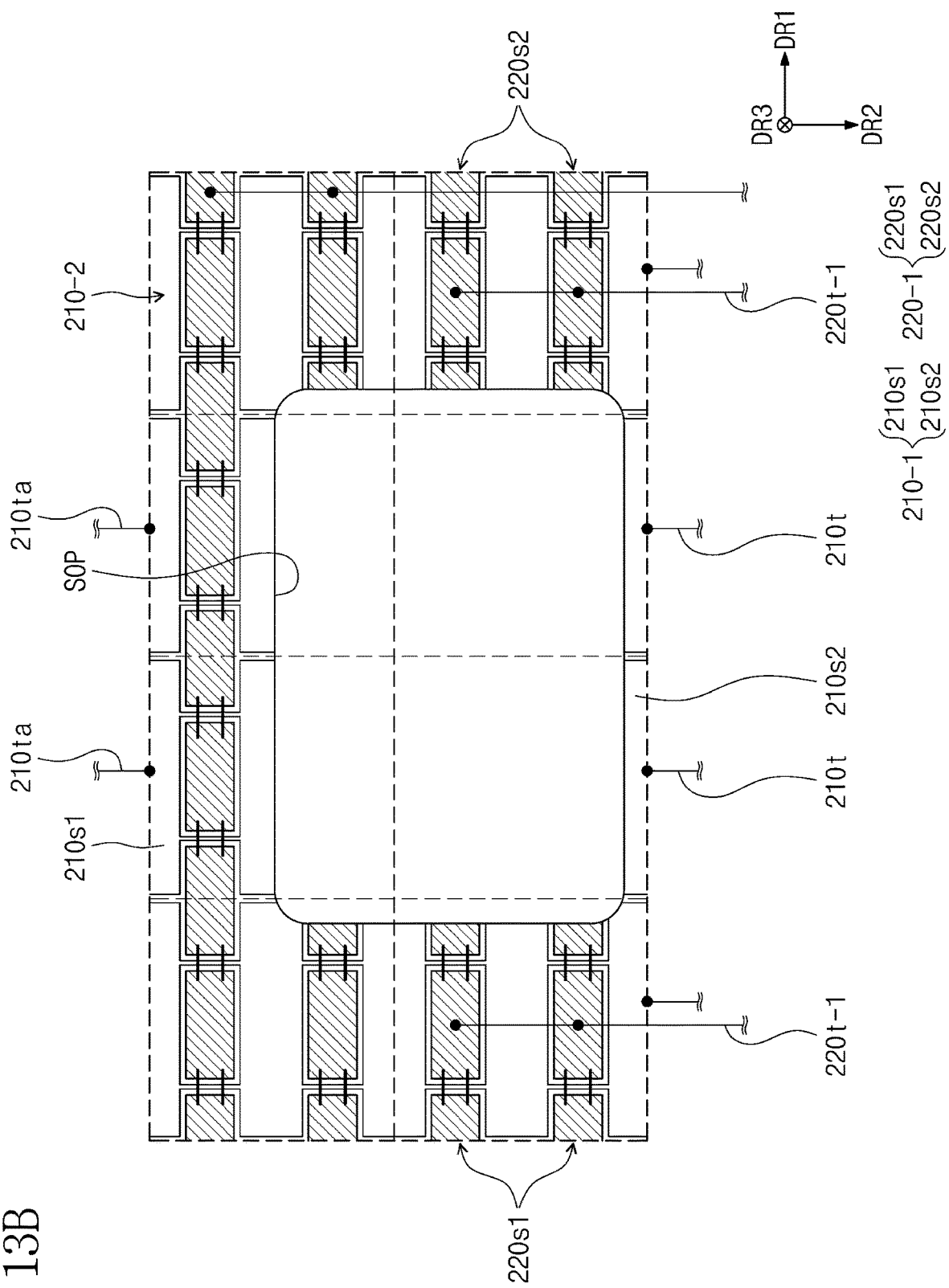
FIG. 13B is an enlarged plan view of a portion of a sensor layer according to an embodiment of the present disclosure.

FIG. 13B is an enlarged plan view of a portion of the sensor layer 200 (see FIG. 5) according to an embodiment of the present disclosure.

Referring to FIGS. 5 and 13B, the opening SOP provided in the sensor layer 200 and the 8 sensing units SU adjacent thereto are illustrated as an example.

The first sub-electrode 220*s*1 of the first-second electrode 220-1 and the second sub-electrode 220*s*2 of the first-second electrode 220-1 spaced apart from each other with the opening SOP interposed therebetween may be connected to the first-second trace lines 220*t*-1, respectively. The first sub-electrode 210*s*1 of the first electrode 210-1 and the second sub-electrode 210*s*2 of the first electrode 210-1 spaced apart from each other with the opening SOP interposed therebetween may be electrically connected to different first trace lines 210*t* and 210*ta*, respectively.

In FIG. 13B, the additional first trace line 210*ta* is connected exclusively to the first sub-electrode 210*s*1 as an example, but the present disclosure is not necessarily particularly limited thereto. For example, trace lines may also be provided to both ends of a first electrode 210-2 that are not separated from each other by the opening SOP. In this case, the first electrode 210-2 may 2 may have a double routing structure in which two trace lines are connected to one electrode.

Figure 14:
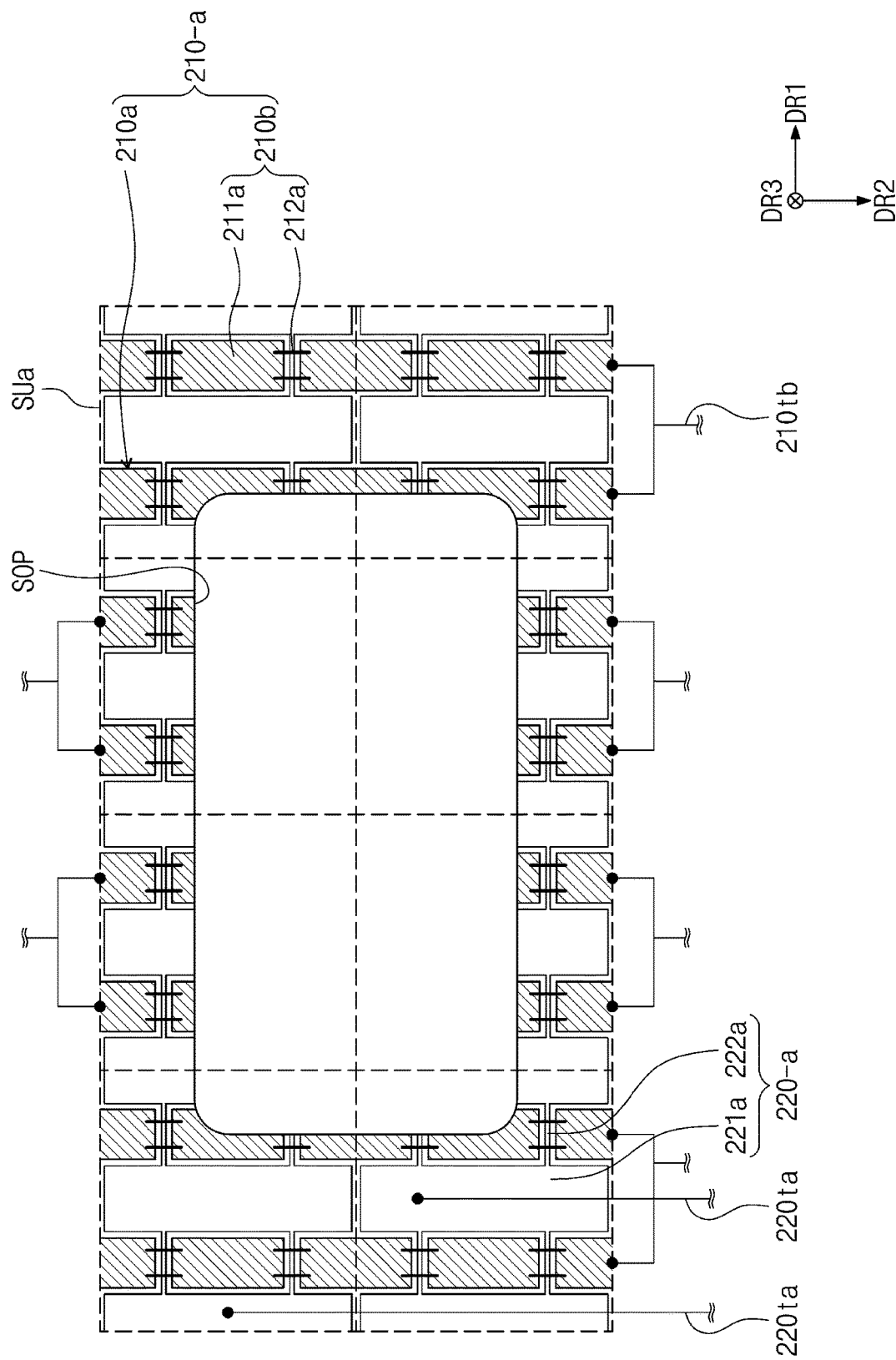
FIG. 14 is an enlarged plan view of a portion of a sensor layer according to an embodiment of the present disclosure.

FIG. 14 is an enlarged plan view of a portion of the sensor layer 200 (see FIG. 5) according to an embodiment of the present disclosure.

Referring to FIGS. 5 and 14, the opening SOP provided in the sensor layer 200 and 8 sensing units SUa adjacent thereto are illustrated as an example. A shape of each of the sensing units SUa shown in FIG. 8 may be substantially the same as the shape of each of the sensing units SU described in FIG. 11 rotated by 90 degrees.

For example, a first electrode 210-*a* may include a first sub-divided electrode 210*a* and a second sub-divided electrode 210*b* spaced apart from each other in the first direction DR1 and extending along the second direction DR2. The first sub-divided electrode 210*a* and the second sub-divided electrode 210*b* may constitute one channel. Accordingly, the first sub-divided electrode 210*a* and the second sub-divided electrode 210*b* may be electrically connected to the same trace line 210*tb*.

Each of the first and second sub-divided electrodes 210*a* and 210*b* may include sensing patterns 211*a* and bridge patterns 212*a* disposed on a layer different from that of the sensing patterns 211*a*. The sensing patterns 211*a* may be spaced apart from each other in the second direction DR2, and the bridge patterns 212*a* may electrically connect the adjacent sensing patterns 211*a* to each other.

A second electrode 220-*a* may include a sensing portion 221*a* and a bridge portion 222*a*. The sensing portion 221*a* and the bridge portion 222*a* may be integrated with each other and may be disposed on the same layer. The sensing portion 221*a* may be referred to as a pattern portion or a first portion, and the bridge portion 222*a* may be referred to as a connection portion or a second portion.

According to one embodiment of the present disclosure, even when the opening SOP is provided in the sensor layer 200, the second electrode 220-*a* extending in the first direction DR1 might not be separated. For example, one of the two bridge portions 222*a* for connecting the adjacent sensing portions 221*a* to each other may be removed by the opening SOP, and all of the second electrodes 220-*a* may be electrically connected by the other bridge portion. Accordingly, in one embodiment of the present disclosure, the second electrode 220-*a* adjacent to the opening SOP may be electrically connected to one second trace line 220*ta*.

Figure 15:
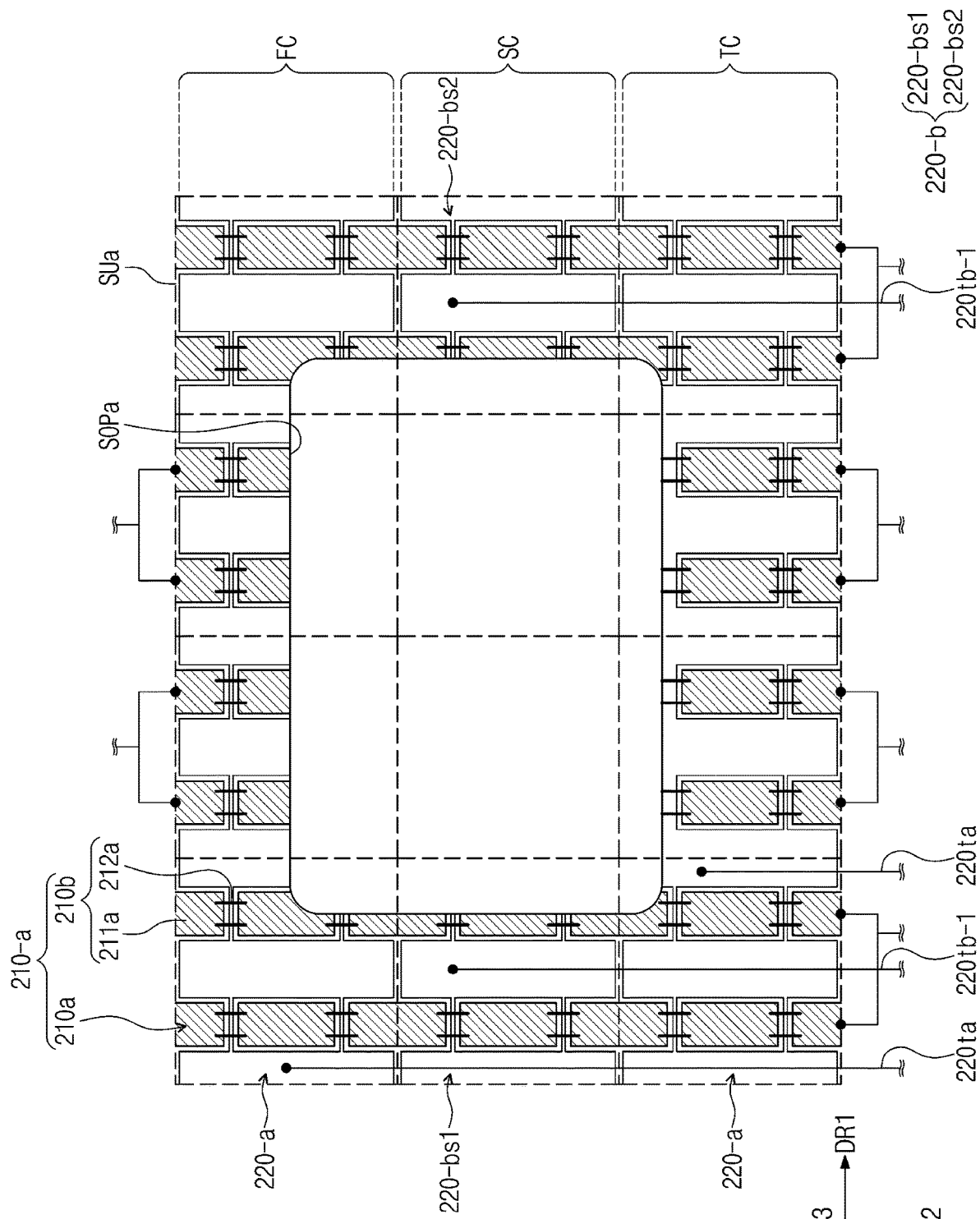
FIG. 15 is an enlarged plan view of a portion of a sensor layer according to an embodiment of the present disclosure.

FIG. 15 is an enlarged plan view of a portion of the sensor layer 200 (see FIG. 5) according to an embodiment of the present disclosure. In a description of FIG. 15, the same reference numerals are given to the components described in FIG. 14, and to the extent that an element is not described in detail with respect to this figure, it may be understood that the element is at least similar to a corresponding element described herein with reference to another figure.

Referring to FIG. 15, an opening SOPa provided in the sensor layer 200 and the 12 sensing units SUa adjacent thereto are shown as an example.

The second electrode 220-*a* included in the sensing units SUa of a first row FC among the sensing units SUa of three rows adjacent to the opening SOPa shown in FIG. 15 and the second electrode 220-*a* included in the sensing units SUa of a third row TC might not be separated from each other by the opening SOPa. One of the two bridge portions 222*a* for connecting the adjacent sensing portions 221*a* to each other may be removed by the opening SOPa and all of the second electrodes 220-*a* may be electrically connected to each other.

A second electrode 220-*b* included in the sensing units SUa of a second row SC may include a first sub-electrode 220-*bs*1 and a second sub-electrode 220-*bs*2 spaced apart from each other with the opening SOPa interposed therebetween. The first sub-electrode 220-*bs*1 and the second sub-electrode 220-*bs*2 may be respectively connected to first-second trace lines 220*tb*-1. Accordingly, lines for connecting the first sub-electrode 220-*bs*1 and the second sub-electrode 220-*bs*2 to each other may be omitted. For example, as the lines are omitted, a size of the opening SOPa may be minimized and an area size of the second electrode 220-*b* may be expanded. Accordingly, the sensing sensitivity of the sensor layer 200 may be increased.

Figure 16:
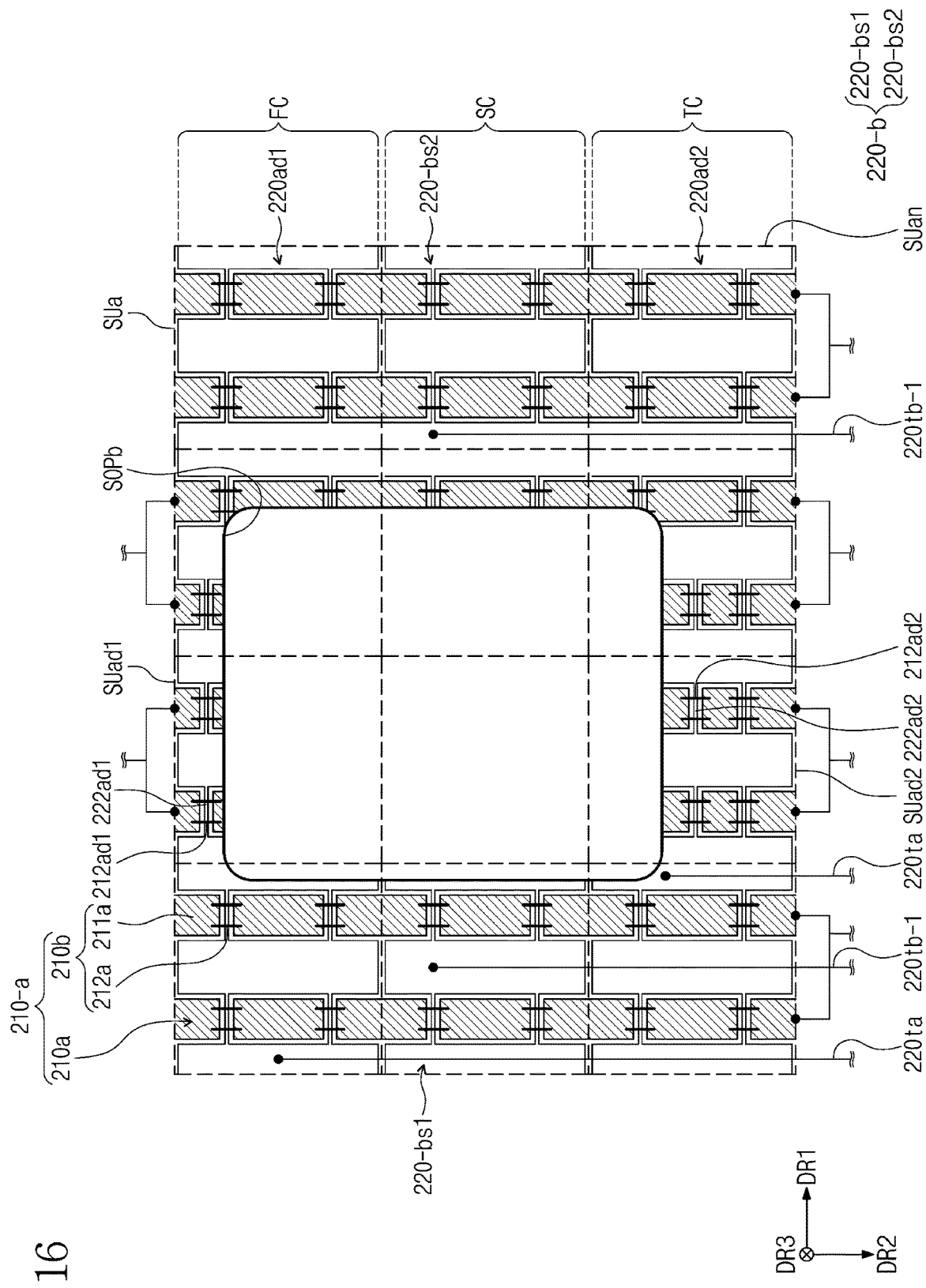
FIG. 16 is an enlarged plan view of a portion of a sensor layer according to an embodiment of the present disclosure.

FIG. 16 is an enlarged plan view of a portion of the sensor layer 200 (see FIG. 5) according to an embodiment of the present disclosure. In a description of FIG. 16, the same reference numerals are given to the components described above, and to the extent that an element is not described in detail with respect to this figure, it may be understood that the element is at least similar to a corresponding element described herein with reference to another figure.

Referring to FIG. 16, an opening SOPb provided in the sensor layer 200 and the 12 sensing units SUa adjacent thereto are shown as an example.

Among the sensing units Sua of the three rows, sensing units SUad1 included in the first row FC and sensing units SUad2 included in the third row TC may have a shape different from that of a sensing unit SUan not in contact with the opening SOPb. For example, shapes or positions of components included in the sensing units SUad1 and the sensing units SUad2 may be different from those of components included in the sensing unit SUan.

Bridge portions 222*ad*1 and bridge patterns 212*ad*1 in the sensing units SUad1 may be adjusted in positions so as not to overlap the opening SOPa. Therefore, second electrodes 220*ad*1 included in the sensing units SUa and SUad1 of the first row FC might not be separated from each other by the opening SOPb.

Bridge portions 222*ad*2 and bridge patterns 212*ad*2 in the sensing units SUad2 may be adjusted in positions so as not to overlap the opening SOPb. Therefore, the number of bridge portions 222*ad*2 and the number of bridge patterns 212*ad*2 respectively included in the sensing units SUa and SUad2 of the third row TC may be kept equal to the number of bridge portions and the number of bridge patterns included in the sensing unit SUan.

Figure 17:
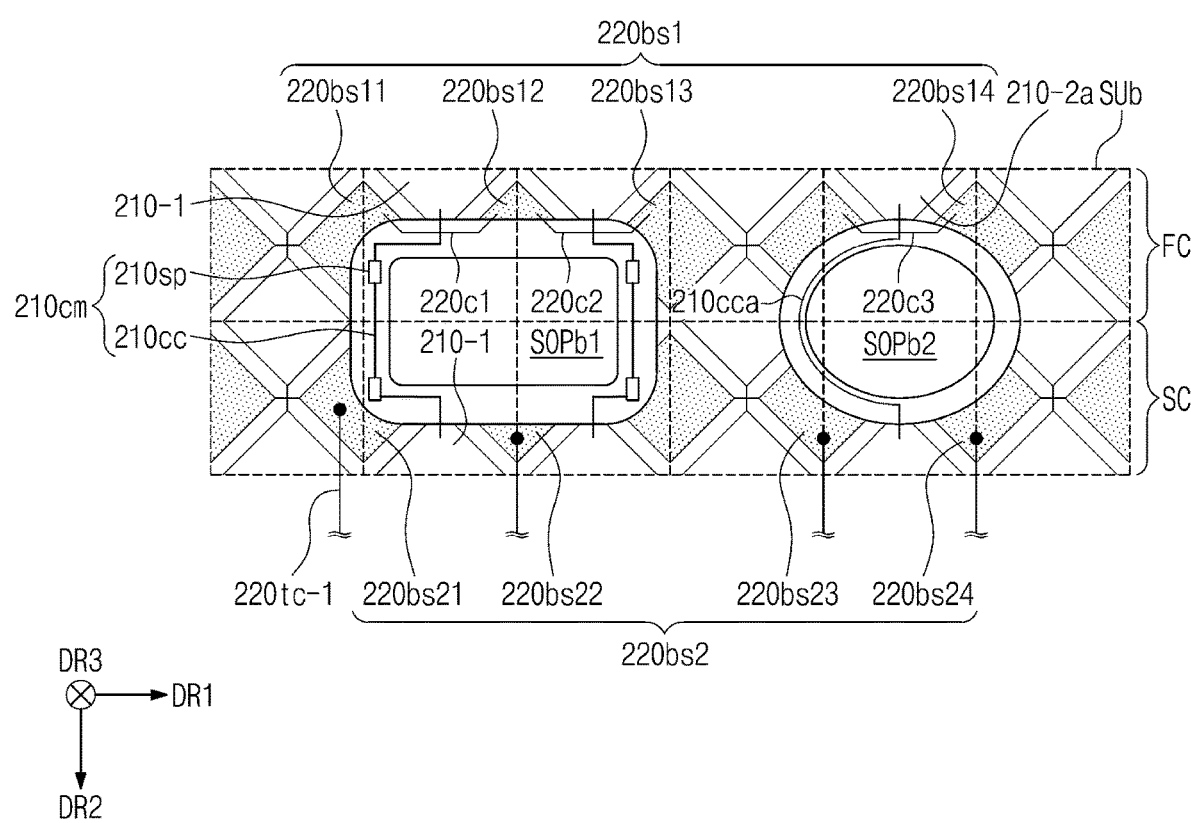
FIG. 17 is an enlarged plan view of a portion of a sensor layer according to an embodiment of the present disclosure.

FIG. 17 is an enlarged plan view of a portion of the sensor layer 200 (see FIG. 5) according to an embodiment of the present disclosure.

Referring to FIGS. 5 and 17, openings SOPb1 and SOPb2 provided in the sensor layer 200 and 12 sensing units SUb adjacent thereto are shown as an example.

Second electrodes 220*bs*1 and 220*bs*2 included in the sensing units SUb of the two rows FC and SC adjacent to the openings SOPb1 and SOPb2 shown in FIG. 17 may be separated from the first opening SOPb1 and the second opening SOPb2. For example, the second electrode 220*bs*1 of the first row FC may include first to fourth sub-electrodes 220*bs*11, 220*bs*12, 220*bs*13, and 220*bs*14. The second electrode 220*bs*2 of the second row SC may include first to fourth sub-electrodes (hereinafter, referred to as fifth to eighth sub-electrodes) 220*bs*21, 220*bs*22, 220*bs*23, and 220*bs*24.

In one embodiment of the present disclosure, the first to fourth sub-electrodes 220*bs*11, 220*bs*12, 220*bs*13, and 220*bs*14 may be electrically connected to each other by a plurality of connection lines 220*c*1, 220*c*2, and 220*c*3. For example, the first connection line 220*c*1 for connecting the first sub-electrode 220*bs*11 and the second sub-electrode 220*bs*12 to each other and the second connection line 220*c*2 for connecting the second sub-electrode 220*bs*12 and the third sub-electrode 220*bs*13 to each other may be disposed adjacent to the first opening SOPb1. The third connection line 220*c*3 for connecting the third sub-electrode 220*bs*13 and the fourth sub-electrode 220*bs*14 to each other may be disposed adjacent to the second opening SOPb2.

In one embodiment of the present disclosure, the fifth to eighth sub-electrodes 220*bs*21, 220*bs*22, 220*bs*23, and 220*bs*24 may be respectively connected to first-second trace lines 220*tc*-1. Accordingly, lines for connecting the fifth to eighth sub-electrodes 220*bs*21, 220*bs*22, 220*bs*23, and 220*bs*24 to each other may be omitted.

In one embodiment of the present disclosure, the first to fourth sub-electrodes 220*bs*11, 220*bs*12, 220*bs*13, and 220*bs*14 may also be connected to a plurality of trace lines in a one-to-one correspondence, respectively, like the fifth to eighth sub-electrodes 220*bs*21, 220*bs*22, 220*bs*23, and 220*bs*24. In this case, the connection lines 220*c*1, 220*c*2, and 220*c*3 may be omitted. In one embodiment of the present disclosure, the fifth to eighth sub-electrodes 220*bs*21, 220*bs*22, 220*bs*23, and 220*bs*24 may also be electrically connected to each other by connection lines adjacent to the first opening SOPb1 and the second opening SOPb2, like the first to fourth sub-electrodes 220*bs*11, 220*bs*12, 220*bs*13, and 220*bs*14. In this case, one trace line may be connected to the first to fourth sub-electrodes 220*bs*11, 220*bs*12, 220*bs*13, and 220*bs*14.

In one embodiment of the present disclosure, one portion and the other portion of the first electrode 210-1 separated from each other by the first opening SOPb1 may be electrically connected to each other by a connection portion 210*cm*. The connection portion 210*cm* may be disposed adjacent to the first opening SOPb1. The connection portion 210*cm* may include auxiliary patterns 210*sp* and connection lines 210*cc*. The auxiliary patterns 210*sp* may be provided to increase the sensing sensitivity, and the auxiliary patterns 210*sp* may be omitted. One portion and the other portion of a first electrode 210-2*a* separated from each other by the second opening SOPb2 may be electrically connected to each other by a connection line 210*cca*. In one embodiment of the present disclosure, the connection line 210*cca* may also further include auxiliary patterns.

Figure 18A:
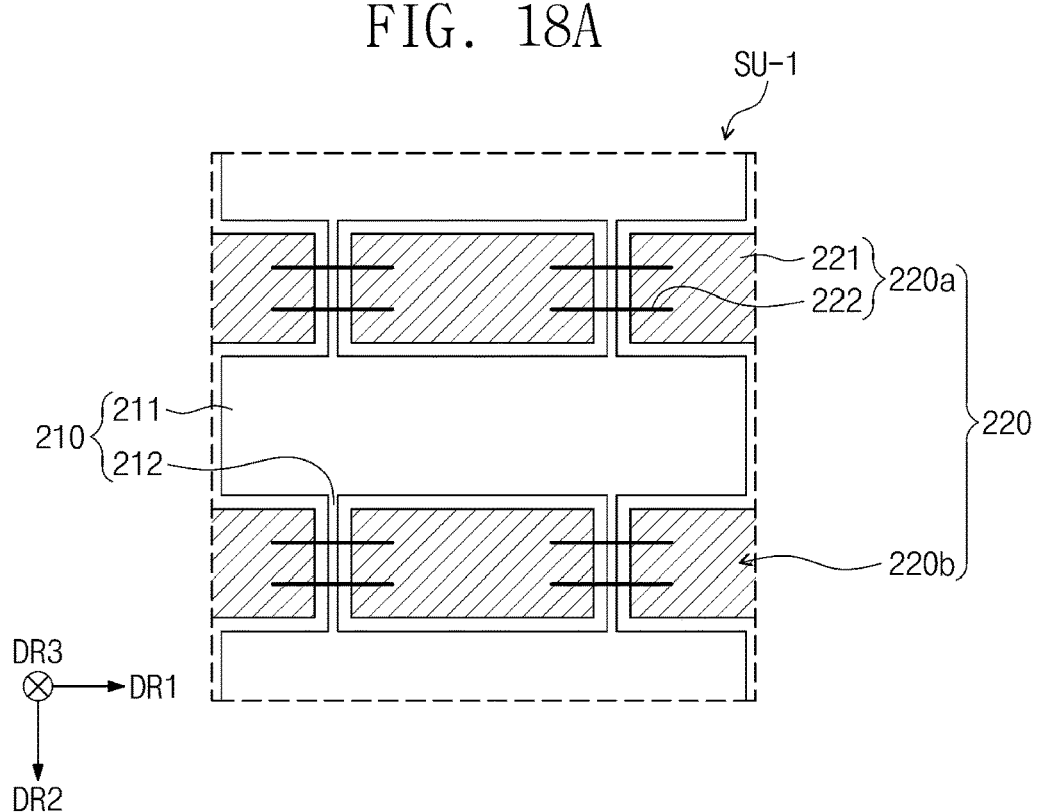
FIG. 18A is a plan view showing a sensing unit according to an embodiment of the present disclosure.
Figure 18B:
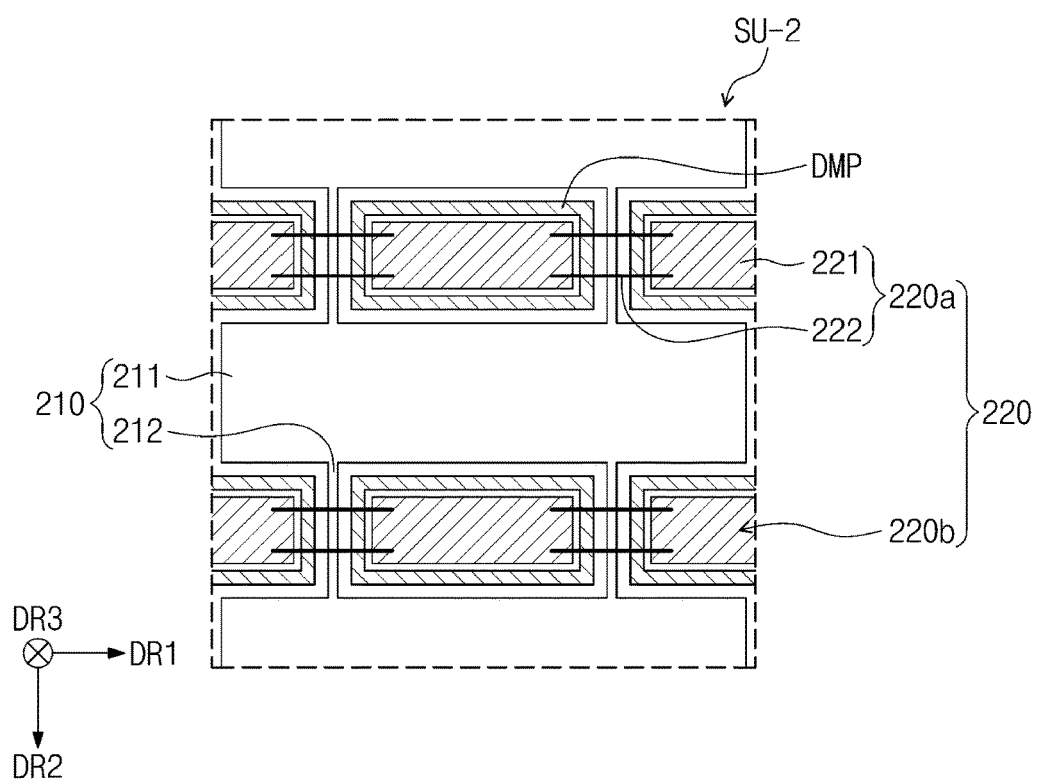
FIG. 18B is a plan view showing a sensing unit according to an embodiment of the present disclosure.

FIG. 18A is a plan view showing a sensing unit SU-1 according to an embodiment of the present disclosure. FIG. 18B is a plan view showing a sensing unit SU-2 according to an embodiment of the present disclosure.

Referring to FIGS. 5, 18A, and 18B, the sensing units SU may include the sensing unit SU-1 of a first shape and the sensing unit SU-2 of a second shape.

In one embodiment of the present disclosure, among the sensor units SU, the shape of the sensing units SU-1 adjacent to the first areas 100A1*a* and 100A1*b* and the shape of the other sensing units SU-2 may be different from each other. For example, the sensing units SU-1 in contact with the first areas 100A1*a* and 100A1*b* might not include a dummy pattern DMP, and the sensing units SU-2 spaced apart from the first areas 100A1*a* may include the dummy pattern DMP. The dummy patterns DMP may be electrically floating or electrically grounded.

The dummy patterns DMP may be disposed between the one corresponding sensing pattern 221 and the first electrode 210. In FIG. 18B, the one dummy pattern DMP completely surrounds the one sensing pattern 221 as an example, but the present disclosure is not necessarily particularly limited thereto. For example, the dummy pattern DMP may face a portion of the sensing pattern 221.

As the sensing units SU-1 do not include the dummy pattern DMP, an amount of change in mutual capacitance before and after touch of each of the sensing units SU-1 in contact with the first areas 100A1*a* and 100A1*b* may increase. Therefore, even when an effective touch area of the sensing units SU-1 is reduced by the first areas 100A1*a* and 100A1*b*, the sensitivity may be increased via differentiation of the shape.

Figure 18C:
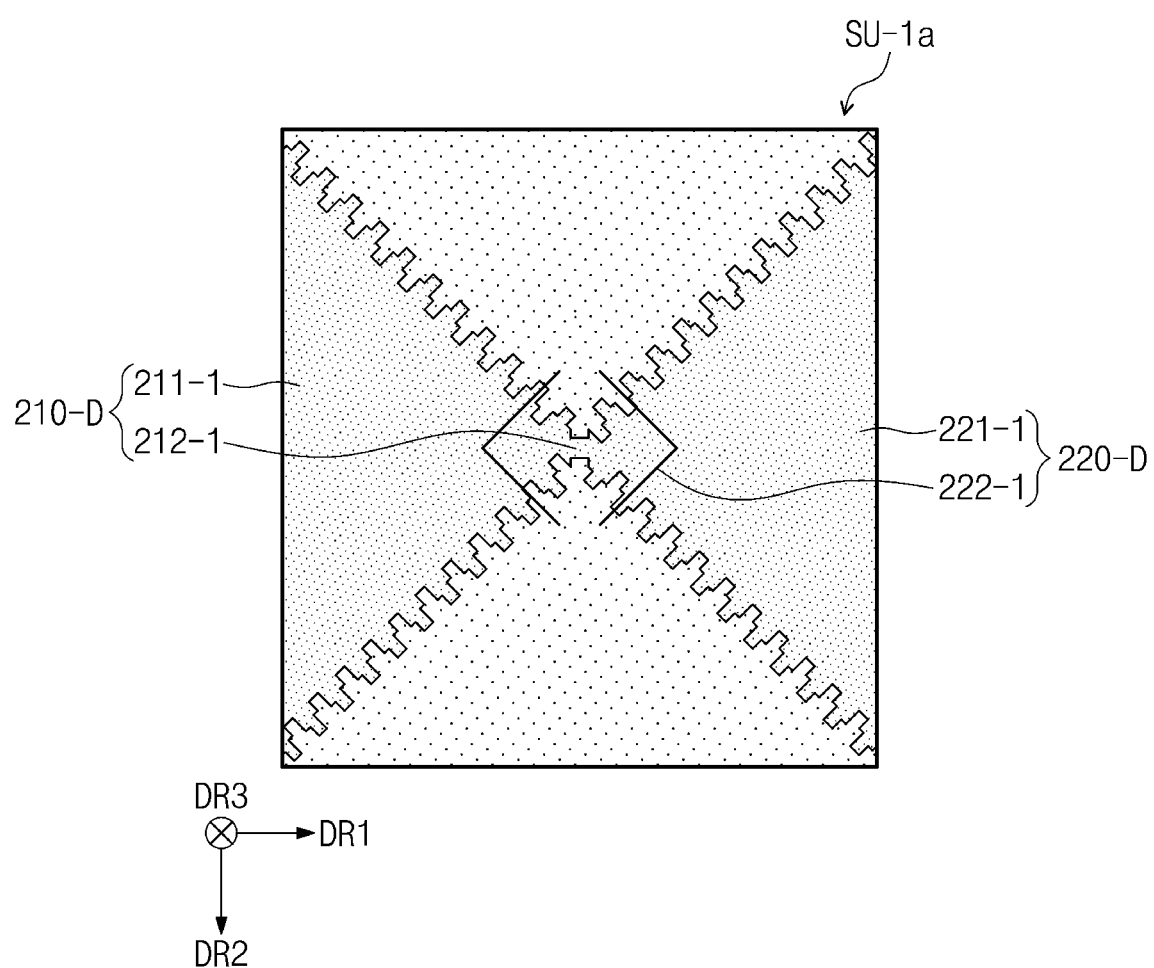
FIG. 18C is a plan view showing a sensing unit according to an embodiment of the present disclosure.
Figure 18D:
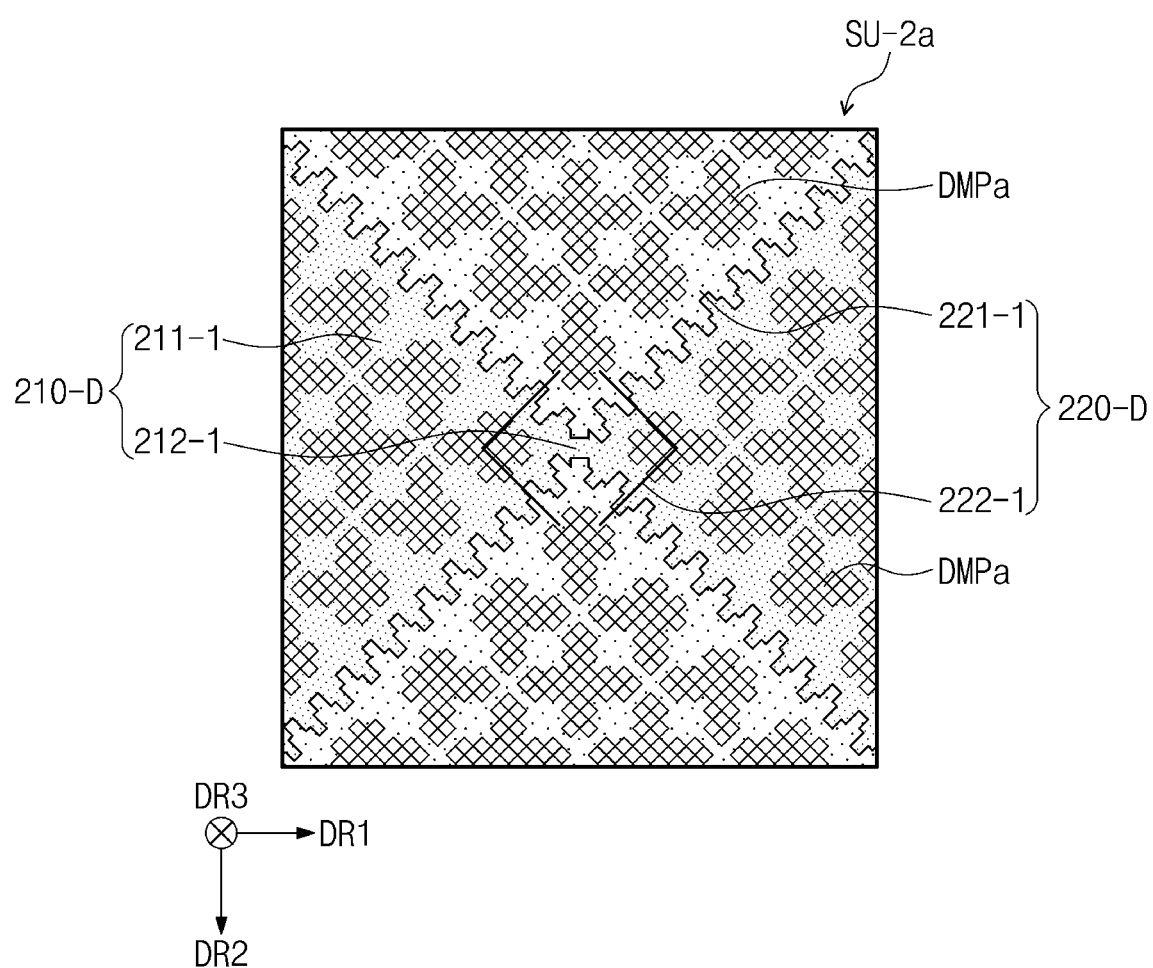
FIG. 18D is a plan view showing a sensing unit according to an embodiment of the present disclosure.

FIG. 18C is a plan view showing a sensing unit SU-1*a* according to an embodiment of the present disclosure. FIG. 18D is a plan view showing a sensing unit SU-2*a* according to an embodiment of the present disclosure.

Referring to FIGS. 5, 18C, and 18D, the sensing units SU may include the sensing unit SU-1*a* of a first shape and the sensing unit SU-2*a* of a second shape.

In one embodiment of the present disclosure, among the sensing units SU, the shape of the sensing units SU-1*a* adjacent to the first areas 100A1*a* and 100A1*b* and the shape of the other sensing units SU-2*a* may be different from each other.

Each of the sensing units SU-1*a* and SU-2*a* may include a portion of a first electrode 210-D and a portion of a second electrode 220-D. The first electrode 210-D and the second electrode 220-D may intersect each other. The first electrode 210-D may include a sensing portion 211-1 and a bridge portion 212-1, and the second electrode 220-D may include sensing patterns 221-1 and bridge patterns 222-1.

The sensing units SU-1*a* in contact with the first areas 100A1*a* and 100A1*b* might not include dummy patterns DMPa, and the sensing units SU-2*a* spaced apart from the first areas 100A1*a* may include the dummy patterns DMPa. The dummy patterns DMPa may be electrically floating or electrically grounded.

As the sensing units SU-1*a* do not include the dummy pattern DMPa, an amount of change in mutual capacitance before and after touch of each of the sensing units SU-1*a* in contact with the first areas 100A1*a* and 100A1*b* may increase. Therefore, even when an effective touch area of the sensing units SU-1*a* is reduced by the first areas 100A1*a* and 100A1*b*, the sensitivity may be increased via differentiation of the shape.

Figure 19:
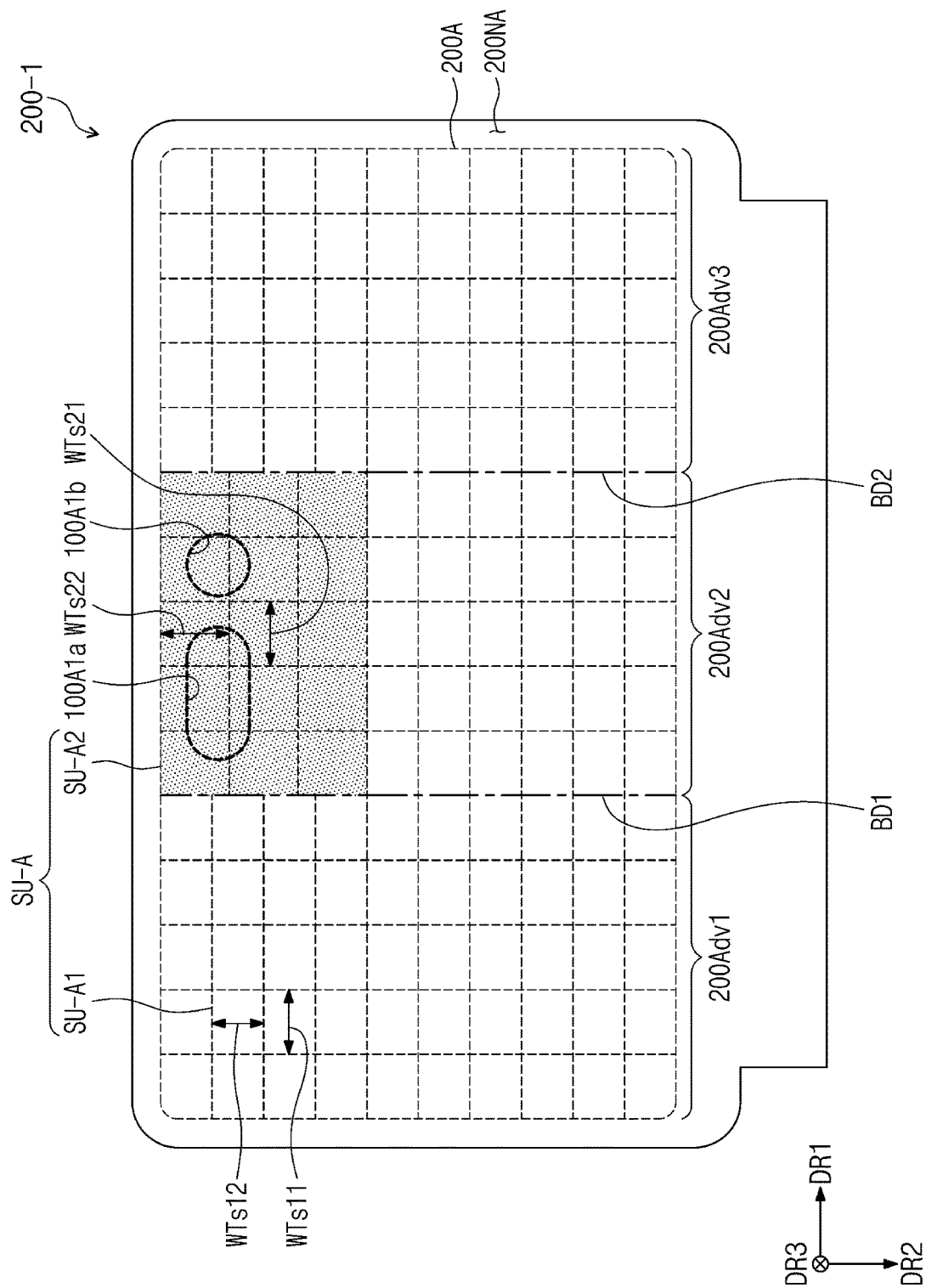
FIG. 19 is a plan view showing a sensor layer according to an embodiment of the present disclosure.

FIG. 19 is a plan view showing a sensor layer 200-1 according to an embodiment of the present disclosure.

Referring to FIG. 19, a plurality of sensing units SU-A may be defined in the sensor layer 200-1. The sensing units SU-A may include a first sensing unit SU-A1 and a second sensing unit SU-A2. For example, the first sensing unit SU-A1 may have a first size, and the second sensing unit SU-A2 may have a second size that is greater than the first size. A width WTs11 in the first direction DR1 of the first sensing unit SU-A1 may be equal to a width WTs21 in the first direction DR1 of the second sensing unit SU-A2, and a width WTs12 in the second direction DR2 of the first sensing unit SU-A1 may be smaller than a width WTs22 in the second direction DR2 of the second sensing unit SU-A2.

In FIG. 19, dot hatching is made on the second sensing units SU-A2. The second sensing units SU-A2 may be disposed in an area adjacent to the first areas 100A1a and 100A1b. According to one embodiment of the present disclosure, even when an effective touch area of the second sensing unit SU-A2 is reduced by the first areas 100A1a and 100A1b, the size of the second sensing units SU-A2 may be adjusted to increase the effective touch area.

In one embodiment of the present disclosure, the first sensing unit SU-A1 may be spaced apart from the second sensing unit SU-A2 in the second direction DR2. Therefore, the second sensing unit SU-A2 may include a portion of the first-second electrode 220-1 (see FIG. 6), and the first sensing unit SU-A1 may include a portion of the second-second electrode 220-2 (see FIG. 6).

In addition, the first areas 100A1a and 100A1b may overlap the second divided driving area 200Adv2. Accordingly, the first sensing units SU-A1 may be disposed in the first divided driving area 200Adv1 and the third divided driving area 200Adv3. Accordingly, some of the first sensing units SU-A1 may be spaced apart from the second sensing unit SU-A2 in the first direction DR1.

In one embodiment of the present disclosure, to facilitate boundary processing between the first divided driving area 200Adv1 and the second divided driving area 200Adv2 and boundary processing between the second divided driving area 200Adv2 and the third divided driving area 200Adv3, the first divided driving area 200Adv1 and the third divided driving area 200Adv3 may also include the second sensing unit SU-A2. For example, in the first and third divided driving areas 200Adv1 and 200Adv3, the first sensing units SU-A1 overlapping the second sensing units SU-A2 of the second divided driving area 200Adv2 in the first direction DR1 may be substituted with the second sensing units SU-A2.

Figure 20:
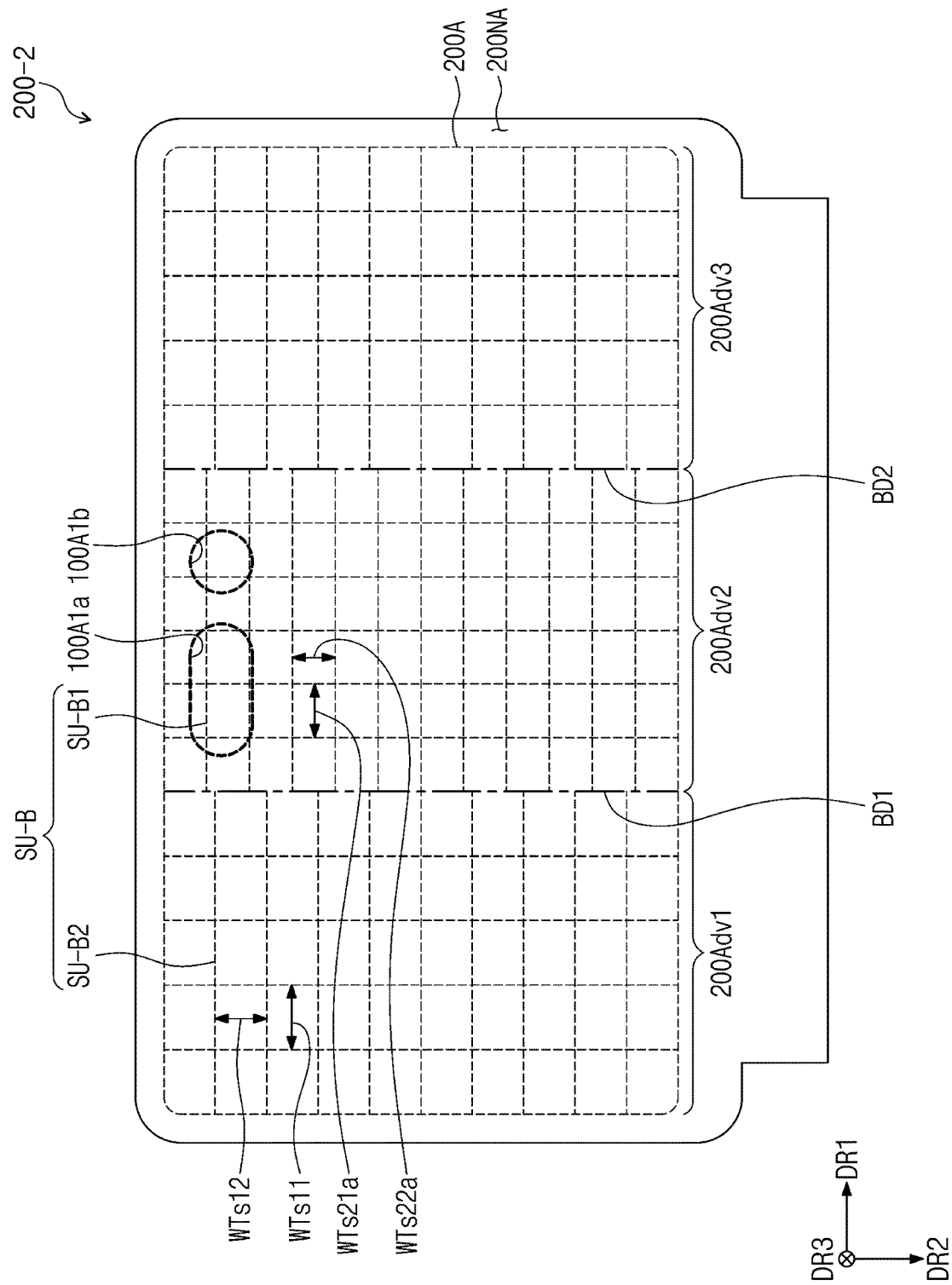
FIG. 20 is a plan view showing a sensor layer according to an embodiment of the present disclosure.

FIG. 20 is a plan view showing a sensor layer 200-2 according to an embodiment of the present disclosure.

Referring to FIG. 20, a plurality of sensing units SU-B may be defined in the sensor layer 200-2. The sensing units SU-B may include a first sensing unit SU-B1 and a second sensing unit SU-B2. For example, the first sensing unit SU-B1 may have a first size, and the second sensing unit SU-B2 may have a second size that is greater than the first size. A width WTs21a in the first direction DR1 of the first sensing unit SU-B1 may be smaller than a width WTs11 in the first direction DR1 of the second sensing unit SU-B2, and a width WTs22a in the second direction DR2 of the first sensing unit SU-B1 may be smaller than a width WTs12 in the second direction DR2 of the second sensing unit SU-B2.

The first areas 100A1a and 100A1b may overlap the second divided driving area 200Adv2. In one embodiment of the present disclosure, the first sensing unit SU-B1 may be disposed in the second divided driving area 200Adv2, and the second sensing unit SU-B2 may be disposed in the first divided driving area 200Adv1 and the third divided driving area 200Adv3. The first sensing unit SU-B1 may include a portion of the first-second electrode 220-1 (see FIG. 6), and the second sensing unit SU-B2 may include a portion of the first divided electrode 220dv1 (see FIG. 5) or the third divided electrode 220dv3 (see FIG. 5).

In one embodiment of the present disclosure, the number of first sensing units SU-B1 arranged in the second direction DR2 in the second divided driving area 200Adv2 may be greater than the number of second sensing units SU-B2 arranged in the second direction DR2 in each of the first and third divided driving areas 200Adv1 and 200Adv3. For example, the number of second divided electrodes 220dv2 may be greater than the number of first divided electrodes 220dv1.

Figure 21A:
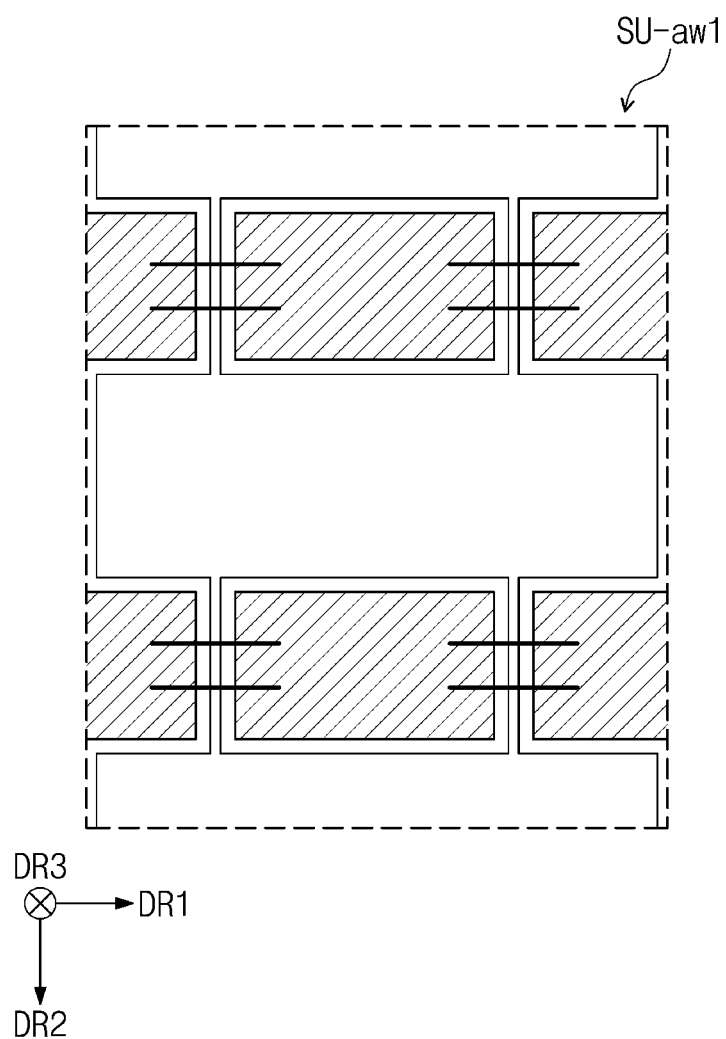
FIG. 21A is a plan view showing a sensing unit according to an embodiment of the present disclosure.
Figure 21B:
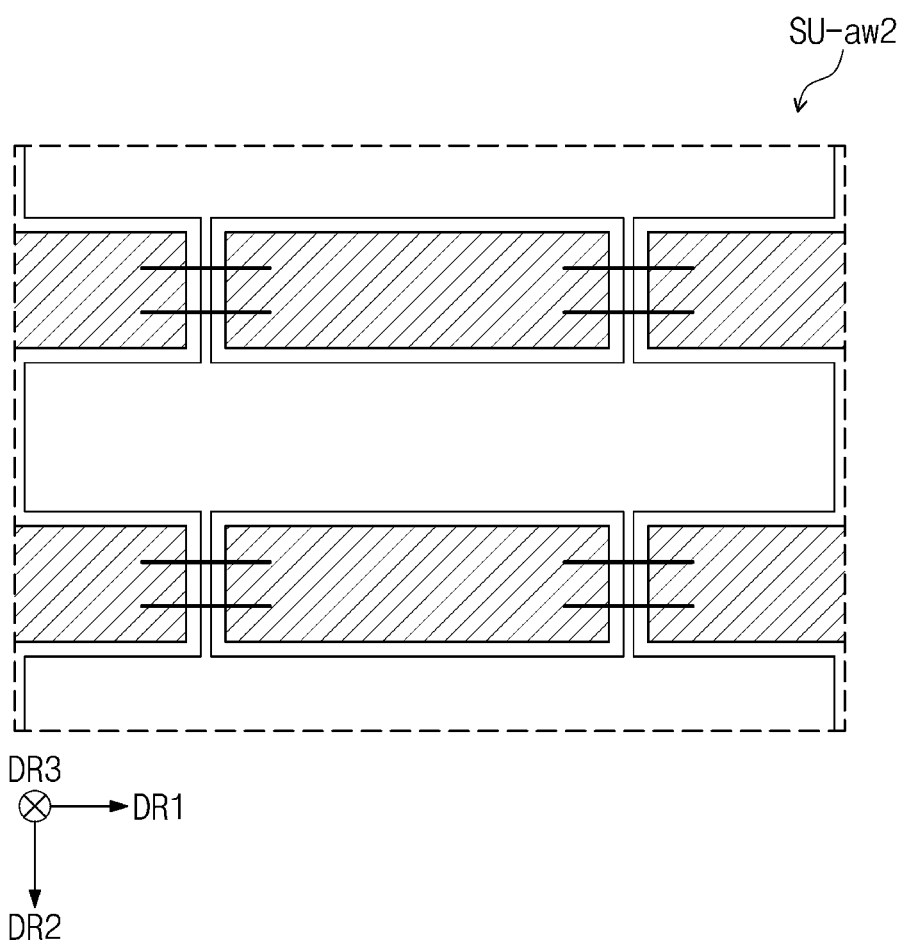
FIG. 21B is a plan view showing a sensing unit according to an embodiment of the present disclosure.

FIG. 21A is a plan view showing a sensing unit according to an embodiment of the present disclosure. FIG. 21B is a plan view showing a sensing unit according to an embodiment of the present disclosure. Referring to FIGS. 21A and 21B, shapes of sensing units SU-aw1 and SU-aw2 whose widths are adjusted are shown as an example.

The sensing unit SU-aw1 shown in FIG. 21A may be obtained by adjusting a width in the second direction DR2 of the sensing unit SU shown in FIG. 11. For example, the sensing unit SU-aw1 may have a shape like extending the width in the second direction DR2 of the sensing unit SU.

The sensing unit SU-aw2 shown in FIG. 21B may be obtained by adjusting a width in the first direction DR1 of the sensing unit SU shown in FIG. 11. For example, the sensing unit SU-aw2 may have a shape like extending the width in the first direction DR1 of the sensing unit SU.

Figure 22:
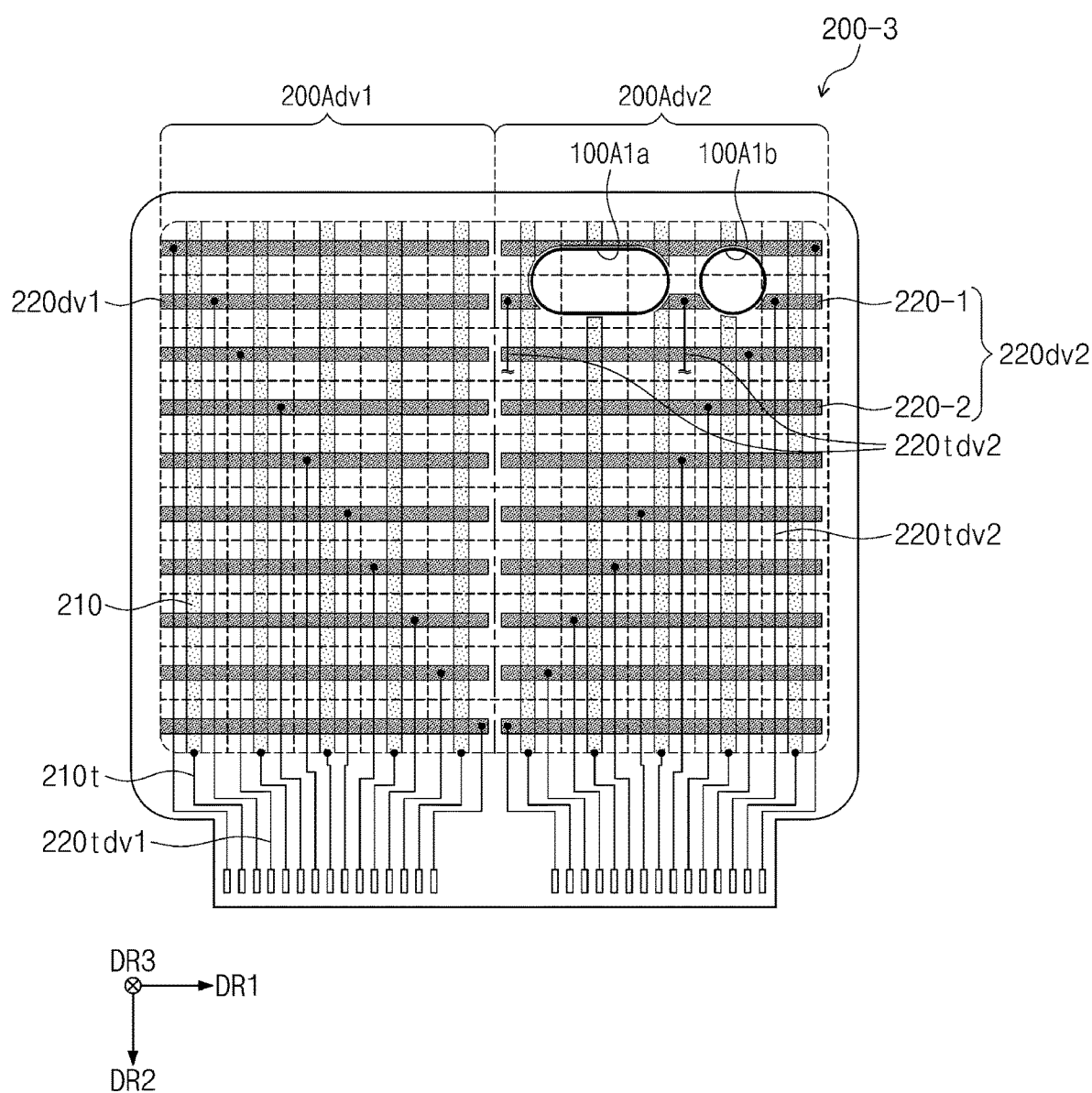
FIG. 22 is a plan view showing a sensor layer according to an embodiment of the present disclosure.

FIG. 22 is a plan view showing a sensor layer 200-3 according to an embodiment of the present disclosure.

Referring to FIG. 22, the first divided driving area 200Adv1 and the second divided driving area 200Adv2 may be defined in the sensor layer 200-3. The first divided driving area 200Adv1 and the second divided driving area 200Adv2 may be adjacent to each other in the first direction DR1.

The sensor layer 200-3 may include the plurality of first electrodes 210, the plurality of first divided electrodes 220dv1, and the plurality of second divided electrodes 220dv2. Each of the first electrodes 210 may extend along the second direction DR2, and the first electrodes 210 may be spaced apart from each other in the first direction DR1. The first divided electrodes 220dv1 may be disposed in the first divided driving area 200Adv1 and may be spaced apart from each other along the second direction DR2. The second divided electrodes 220dv2 may be disposed in the second divided driving area 200Adv2 and may be spaced apart from each other along the second direction DR2.

The sensor layer 200-3 may include the first trace lines 210t electrically connected to the first electrodes 210, the first divided trace lines 220tdv1 electrically connected to the first divided electrodes 220dv1, and the second divided trace lines 220tdv2 electrically connected to the second divided electrodes 220dv2.

In one embodiment of the present disclosure, both the first areas 100A1a and 100A1b may overlap the second divided driving area 200Adv2. Therefore, the at least one first-second electrode 220-1 among the second divided electrodes 220dv2 may be adjacent to the first areas 100A1a and 100A1b. Accordingly, the first-second electrode 220-1 may include sub-electrodes separated from each other by the first areas 100A1a and 100A1b.

In one embodiment of the present disclosure, the second divided trace lines 220tdv2 may also be electrically connected to the sub-electrodes separated from each other, respectively. Therefore, even when the number of first divided electrodes 220dv1 and the number of second divided electrodes 220dv2 are the same, the number of second divided trace lines 220tdv2 may be greater than the number of first divided trace lines 220tdv1. For example, when the number of first divided trace lines 220tdv1 is 10 in FIG. 22, the number of second divided trace lines 220tdv2 may be 12.

Figure 23:
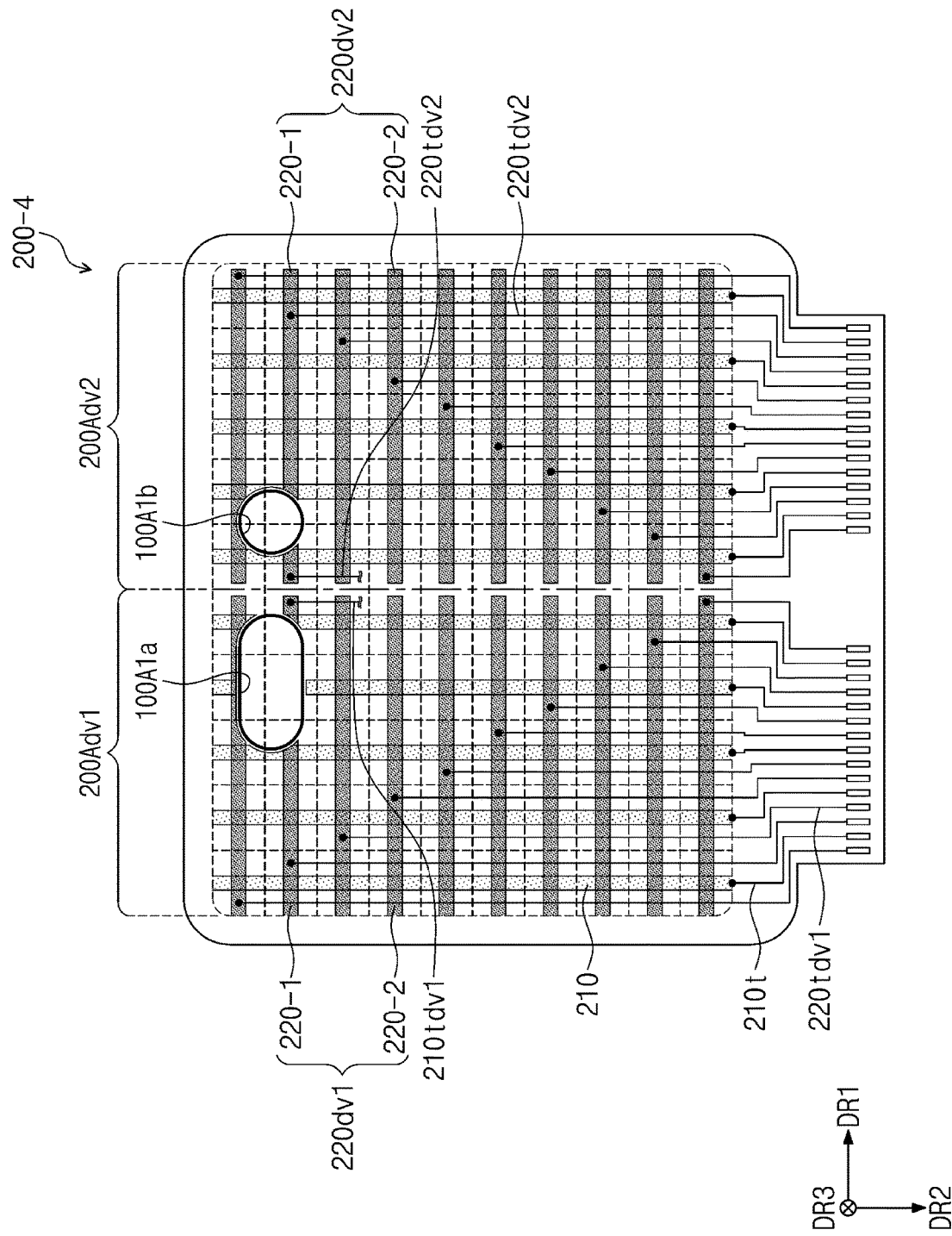
FIG. 23 is a plan view showing a sensor layer according to an embodiment of the present disclosure.

FIG. 23 is a plan view showing a sensor layer 200-4 according to an embodiment of the present disclosure. In a description of FIG. 23, the same reference numerals are given to the components described in FIG. 22, and to the extent that an element is not described in detail with respect to this figure, it may be understood that the element is at least similar to a corresponding element described herein with reference to another figure.

Referring to FIG. 23, the first divided driving area 200Adv1 and the second divided driving area 200Adv2 may be defined in the sensor layer 200-4. The first divided driving area 200Adv1 and the second divided driving area 200Adv2 may be adjacent to each other in the first direction DR1.

In one embodiment of the present disclosure, the first-first area 100A1a may overlap the first divided driving area 200Adv1, and the second-first area 100A1b may overlap the second divided driving area 200Adv2. Therefore, the at least one first-second electrode 220-1 of the first divided electrodes 220$dv$1 may be adjacent to the first-first area 100A1a, and the at least one first-second electrode 220-1 of the second divided electrodes 220$dv$2 may be adjacent to the second-first area 100A1b.

Some of the first divided trace lines 220$tdv$1 may be connected to the sub-electrodes of the first-second electrode 220-1 separated from each other by the first-first area 100A1a in one-to-one correspondence, respectively. Some of the second divided trace lines 220$tdv$2 may be connected to the sub-electrodes of the first-second electrode 220-1 separated from each other by the second-first area 100A1b in a one-to-one correspondence, respectively.

In one embodiment of the present disclosure, the number of first divided trace lines 220$tdv$1 may be greater than the number of first divided electrodes 220$dv$1, and the number of second divided trace lines 220$tdv$2 may be greater than the number of second divided electrodes 220$dv$2. For example, when the number of first divided electrodes 220$dv$1 and the number of second divided electrodes 220$dv$2 are 10 in FIG. 23, the number of first divided trace lines 220$tdv$1 and the number of second divided trace lines 220$tdv$2 may be 11.

Figure 24:
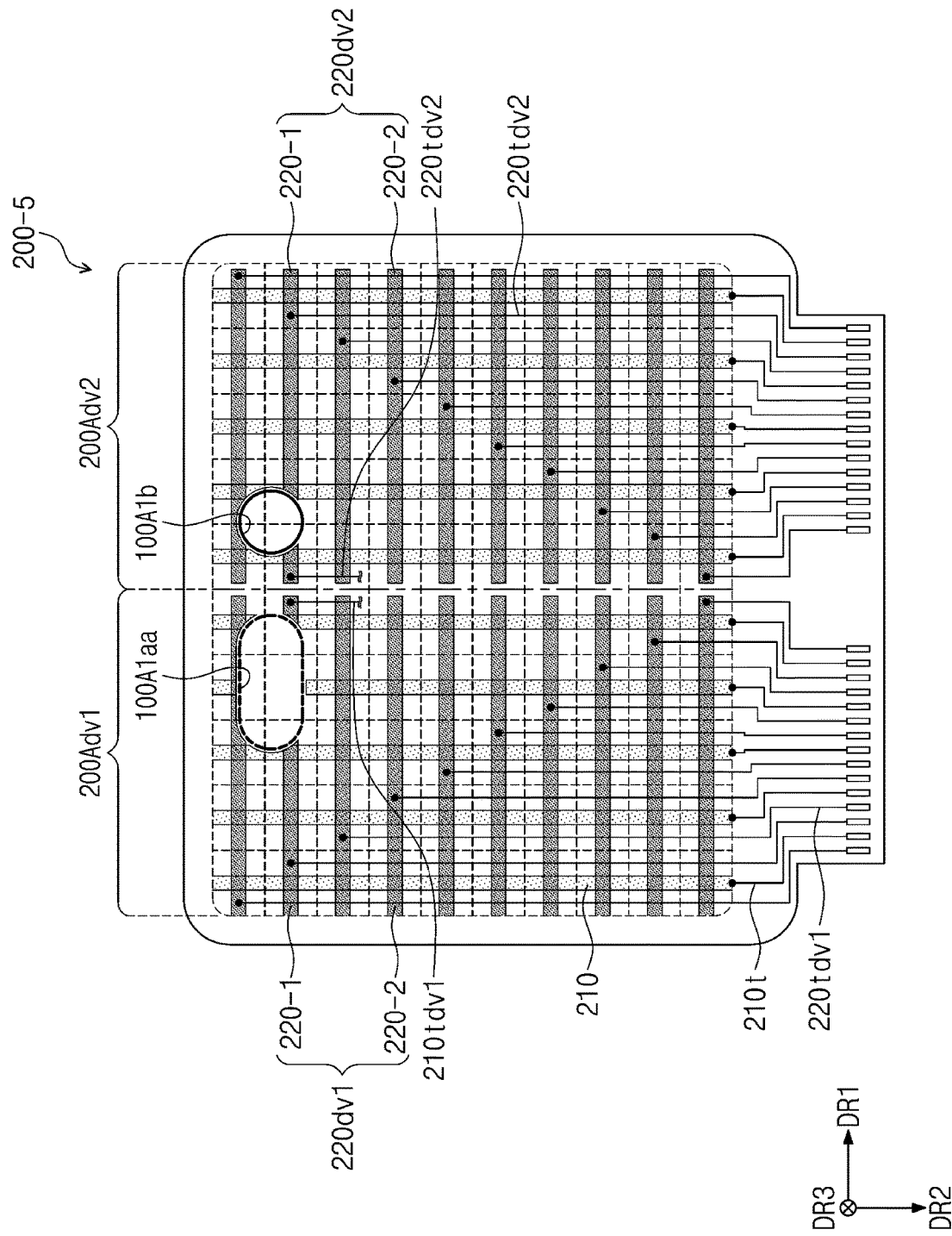
FIG. 24 is a plan view showing a sensor layer according to an embodiment of the present disclosure.

FIG. 24 is a plan view showing a sensor layer 200-5 according to an embodiment of the present disclosure. In a description of FIG. 24, the same reference numerals are given to the components described in FIG. 22, and to the extent that an element is not described in detail with respect to this figure, it may be understood that the element is at least similar to a corresponding element described herein with reference to another figure.

Referring to FIG. 24, the first divided driving area 200Adv1 and the second divided driving area 200Adv2 may be defined in the sensor layer 200-5. The first divided driving area 200Adv1 and the second divided driving area 200Adv2 may be adjacent to each other in the first direction DR1.

In one embodiment of the present disclosure, the first-first area 100A1aa may overlap the first divided driving area 200Adv1, and the second-first area 100A1b may overlap the second divided driving area 200Adv2. The first-first area 100A1aa may be an area displaying the image. Therefore, at least one of the first divided electrodes 220$dv$1 may overlap or be adjacent to the first-first area 100A1aa. For example, when the first-second electrode 220-1 is disposed in an area overlapping the first-first area 100A1aa, the first-second electrode 220-1 might not be divided into the sub-electrodes. Alternatively, when a portion of the first-second electrode 220-1 is removed in the area overlapping the first-first area 100A1aa, the first-second electrode 220-1 may be divided into the sub-electrodes.

Figure 25:
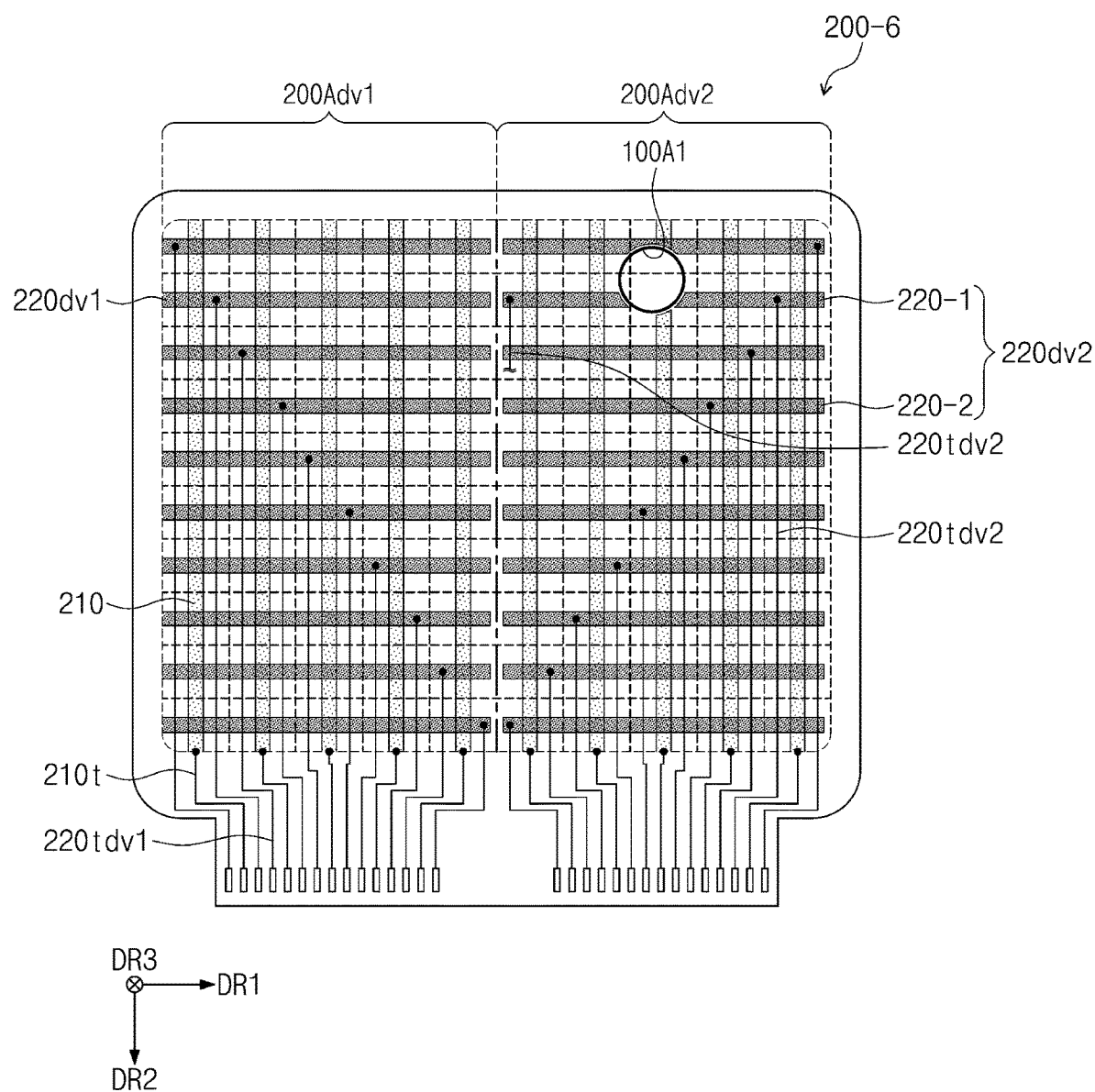
FIG. 25 is a plan view showing a sensor layer according to an embodiment of the present disclosure.

FIG. 25 is a plan view showing a sensor layer 200-6 according to an embodiment of the present disclosure.

Referring to FIG. 25, the first divided driving area 200Adv1 and the second divided driving area 200Adv2 may be defined in the sensor layer 200-6. The first divided driving area 200Adv1 and the second divided driving area 200Adv2 may be adjacent to each other in the first direction DR1.

Figure 26:
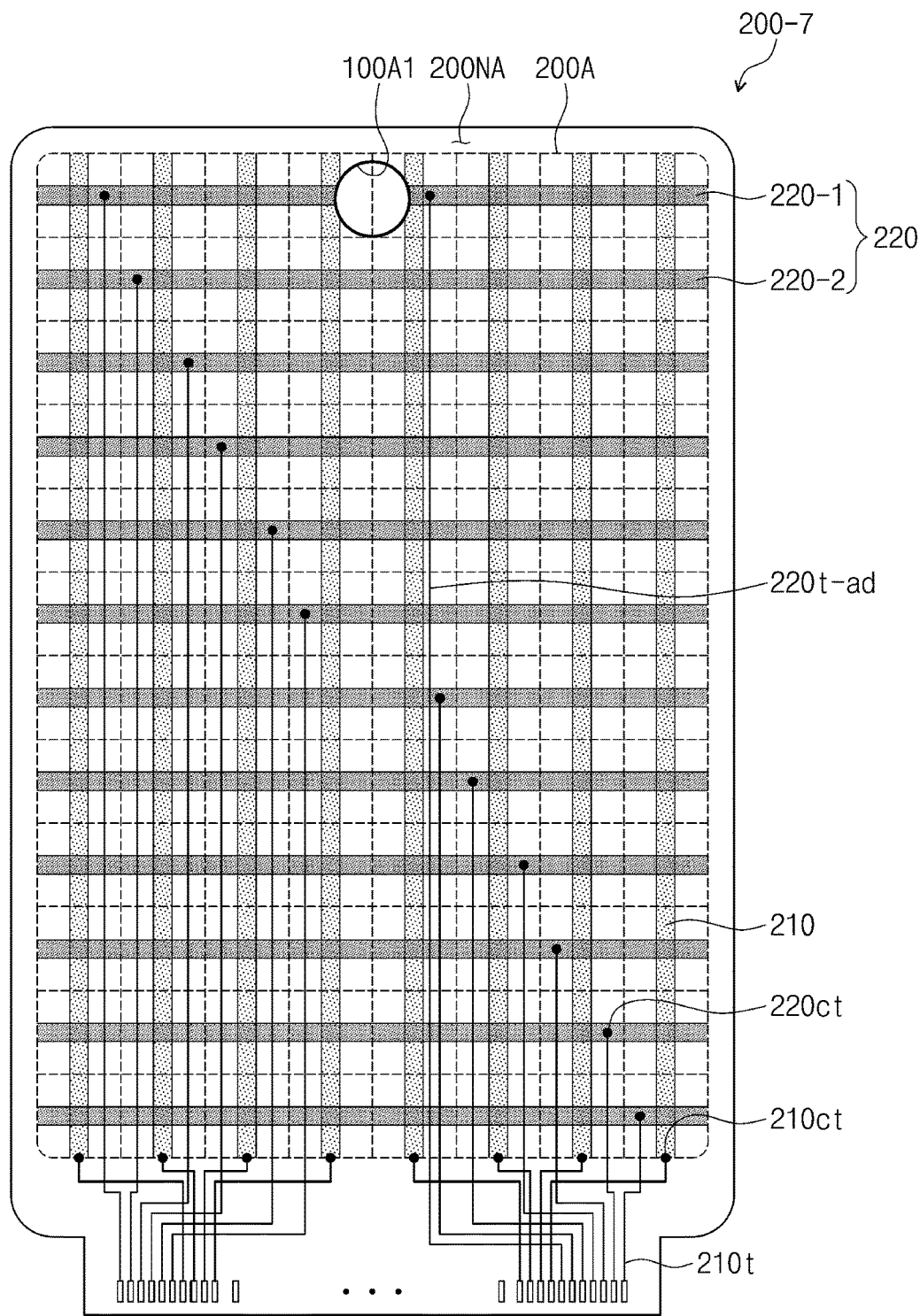
FIG. 26 is a plan view showing a sensor layer according to an embodiment of the present disclosure.

In one embodiment of the present disclosure, a first area 100A1 may overlap the second divided driving area 200Adv2. Accordingly, the at least one first-second electrode 220-1 of the second divided electrodes 220$dv$2 may overlap or be adjacent to the first area 100A1. Some of the second divided trace lines 220$tdv$2 may be connected to the sub-electrodes of the first-second electrode 220-1 separated from each other by the first area 100A1 in a one-to-one correspondence, respectively. FIG. 26 is a plan view showing a sensor layer 200-7 according to an embodiment of the present disclosure.

Referring to FIG. 26, unlike the above-described embodiments, divided driving areas might not be defined in the sensor layer 200-7. Accordingly, the sensor layer 200-7 may 7 may include the plurality of first electrodes 210 and the plurality of second electrodes 220 disposed in the sensing area 200A. The first electrodes 210 may be arranged along the first direction DR1, and the second electrodes 220 may be arranged along the second direction DR2 intersecting the first direction DR1. Each of the first electrodes 210 may extend along the second direction DR2, and each of the first electrodes 210 may intersect the second electrodes 220. Each of the second electrodes 220 may extend along the first direction DR1, and each of the second electrodes 220 may intersect the first electrodes 210.

The at least one first-second electrode 220-1 of the second electrodes 220 may overlap or be adjacent to the first area 100A1. The sub-electrodes of the first-second electrode 220-1 separated from each other by the first area 100A1 may be connected to the second trace lines 220$t$ in a one-to-one correspondence, respectively.

In FIGS. 22 to 26, the example in which the sensing units included in the sensor layer are all have the same size has been described, but the present disclosure is not necessarily particularly limited thereto. For example, the embodiment described in FIG. 19 or the embodiment described in FIG. 20 may be combined with each of the embodiments described with reference to FIGS. 22 to 26.

As described above, the sensor layer includes the plurality of first electrodes, the plurality of second electrodes, the plurality of first trace lines, and the plurality of second trace lines. At least a portion of the second trace lines may overlap the display area. Thus, the area size of the peripheral area may be reduced. As a result, the area size occupied by the non-display area on the display surface of the electronic device may be reduced, and the narrow bezel may be implemented.

In addition, the opening may be defined in the sensor layer, and the one second electrode adjacent to the opening may be separated into the plurality of sub-electrodes. The second trace lines may be respectively connected to the plurality of sub-electrodes. Accordingly, the lines for connecting the plurality of sub-electrodes to each other may be omitted. As the lines are omitted, the size of the opening may be minimized, and the area size of the second electrode may be expanded, so that the sensing sensitivity of the sensor layer may be increased.

Hereinabove, the description has been achieved with reference to the preferred embodiment of the present disclosure, but those skilled in the art or those having ordinary knowledge in the technical field will understand that the present disclosure may be variously modified and changed within the scope without departing from the spirit and technical region of the present disclosure.

What is claimed is:

1. An electronic device, comprising:
a display layer including a display area and a non-display area adjacent to the display area, wherein the display area includes a first area having a first light transmittance and a second area having a second light transmittance that is lower than the first light transmittance; and
a sensor layer including a sensing area and a peripheral area adjacent to the sensing area,
wherein the sensor layer includes:
a plurality of first electrodes disposed in the sensing area and arranged along a first direction;
a plurality of first trace lines electrically connected to the plurality of first electrodes;
a plurality of second electrode groups disposed in the sensing area,
arranged along a second direction intersecting the first direction, and intersects with the plurality of first electrodes; and
a plurality of second trace lines electrically connected to the plurality of second electrode groups and overlapping the sensing area,
wherein the plurality of second electrode groups includes a first-second electrode adjacent to the first area and a second-second electrode spaced apart from the first area,
wherein the plurality of second trace lines includes a plurality of first-second trace lines electrically connected to the first-second electrode and a second-second trace line electrically connected to the second-second electrode, and
wherein the first-second electrode is divided by the first area into distinct sections that are connected by the first-second trace lines on a one-to-one correspondence.

2. The electronic device of claim 1, wherein the first-second electrode includes a first sub-electrode and a second sub-electrode spaced apart from the first sub-electrode with the first area interposed therebetween, and
wherein the plurality of first-second trace lines are electrically connected to the first and second sub-electrodes in a one-to-one correspondence, respectively.

3. The electronic device of claim 1, wherein the sensor layer further includes a plurality of pads respectively connected to the plurality of first-second trace lines.

4. The electronic device of claim 1, wherein the sensor layer further includes a pad electrically connected to the plurality of first-second trace lines.

5. The electronic device of claim 1, wherein the sensor layer includes a plurality of sensing units, and each of the plurality of sensing units corresponds to an area where one of the plurality of first electrodes and one of the plurality of second electrode groups intersect each other.

6. The electronic device of claim 5, wherein the plurality of sensing units include a first sensing unit having a first size and a second sensing unit having a second size that is greater than the first size.

7. The electronic device of claim 6, wherein the second sensing unit is disposed in an area adjacent to the first area, and the first sensing unit is spaced apart from the second sensing unit in the second direction.

8. The electronic device of claim 7, wherein a width in the first direction of the first sensing unit is equal to a width in the first direction of the second sensing unit, and
wherein a width in the second direction of the first sensing unit is smaller than a width in the second direction of the second sensing unit.

9. The electronic device of claim 6, wherein the second sensing unit is disposed in an area adjacent to the first area, and the first sensing unit is spaced apart from the second sensing unit in the first direction.

10. The electronic device of claim 9, wherein a width in the first direction of the first sensing unit is smaller than a width in the first direction of the second sensing unit, and
wherein a width in the second direction of the first sensing unit is smaller than a width in the second direction of the second sensing unit.

11. The electronic device of claim 5, wherein the plurality of sensing units include a first sensing unit having a first shape and a second sensing unit having a second shape that is different from the first shape, and the first sensing unit is disposed in an area that is closer to the first area than to the second sensing unit.

12. The electronic device of claim 1, wherein the sensor layer includes a first divided driving area and a second divided driving area adjacent to the first divided driving area in the first direction, and the first area overlaps the second divided driving area.

13. The electronic device of claim 12, wherein the plurality of second electrode groups include a plurality of first divided electrodes overlapping the first divided driving area and arranged along the second direction, and a plurality of second divided electrodes overlapping the second divided driving area and arranged along the second direction,
wherein the plurality of second trace lines includes a plurality of first divided trace lines electrically connected to the plurality of first divided electrodes and a plurality of second divided trace lines electrically connected to the plurality of second divided electrodes, and
wherein the number of plurality of second divided trace lines is equal to or greater than the number of plurality of first divided trace lines.

14. The electronic device of claim 13, wherein the number of plurality of second divided electrodes is equal to or greater than the number of plurality of first divided electrodes.

15. The electronic device of claim 13, wherein a third area having a third light transmittance that is higher than the second light transmittance is further defined in the display area of the display layer, and the third area overlaps either the first divided driving area or the second divided driving area.

16. The electronic device of claim 1, wherein the first area and the second area display an image.

17. The electronic device of claim 1, wherein a hole where a portion of the display layer is omitted is defined in the first area of the display layer.

18. An electronic device, comprising:
a display layer including a display area and a non-display area adjacent to the display area, wherein the display area includes a first area having a first light transmittance and a second area having a second light transmittance that is lower than the first light transmittance; and
a sensor layer including a sensing area and a peripheral area adjacent to the sensing area,
wherein the sensor layer includes:
a plurality of first electrodes disposed in the sensing area and arranged along a first direction;
a plurality of first trace lines electrically connected to the plurality of first electrodes;
a plurality of second electrode groups disposed in the sensing area, arranged along a second direction intersecting the first direction, and intersects with the plurality of first electrodes; and
a plurality of second trace lines electrically connected to the plurality of second electrode groups and overlapping the sensing area,
wherein the plurality of second electrode groups includes a first-second electrode and a second-second electrode spaced apart from the first-second electrode in the second direction,
wherein the plurality of second trace lines includes a plurality of first-second trace lines electrically connected to the first-second electrode and a second-second trace line electrically connected to the second-second electrode,
wherein a number of the plurality of first-second trace lines is greater than a number of the second-second trace lines, and
wherein the first-second electrode is divided by the first area into distinct sections that are connected by the first-second trace lines on a one-to-one correspondence.

19. The electronic device of claim 18, wherein the first-second electrode includes a first sub-electrode and a second sub-electrode spaced apart from the first sub-electrode in the first direction, and
wherein the plurality of first-second trace lines are electrically connected to the first and second sub-electrodes in a one-to-one correspondence, respectively.

20. The electronic device of claim 18, wherein the sensor layer includes a plurality of sensing units, and each of the plurality of sensing units corresponds to an area where one of the plurality of first electrodes and one of the plurality of second electrode groups intersect each other, and
wherein the plurality of sensing units include a first sensing unit having a first size and a second sensing unit having a second size that is greater than the first size.

21. The electronic device of claim 20, wherein the second sensing unit includes a portion of the first-second electrode, and
wherein the first sensing unit includes a portion of the second-second electrode.

22. The electronic device of claim 20, wherein the plurality of second electrode groups includes a plurality of first divided electrodes and a plurality of second divided electrodes spaced apart from the plurality of first divided electrodes in the first direction,
wherein the first-second electrode and the second-second electrode are included in the plurality of second divided electrodes,
wherein the first sensing unit includes a portion of the first-second electrode, and
wherein the second sensing unit includes a portion of one of the plurality of first divided electrodes.

23. An electronic device, comprising:
a display layer including a display area and a non-display area adjacent to the display area, wherein the display area includes a first area having a first light transmittance and a second area having a second light transmittance that is lower than the first light transmittance; and
a sensor layer including a sensing area, the sensing area including a first divided driving area, and a second divided driving area adjacent to the first divided driving area in a first direction and overlapping the first area,
wherein the sensor layer includes:
a plurality of first electrodes disposed in the sensing area and arranged along the first direction;
a plurality of first divided electrodes overlapping the first divided driving area, arranged along a second direction intersecting the first direction, and intersecting with at least some of the first electrodes;
a plurality of second divided electrodes overlapping the second divided driving area, arranged along the second direction, and intersecting with at least some of the first electrodes;
a plurality of first divided trace lines electrically connected to the plurality of first divided electrodes; and
a plurality of second divided trace lines electrically connected to the plurality of second divided electrodes,
wherein a number of the plurality of second divided trace lines is greater than a number of the plurality of first divided trace lines,
wherein one of the plurality of second divided electrodes includes a first sub-electrode and a second sub-electrode spaced apart from the first sub-electrode with the first area interposed therebetween, and
wherein one of the plurality of second divided trace lines is connected to the first sub-electrode,
and another of the plurality of second divided trace lines is connected to the second sub-electrode.

24. The electronic device of claim 23, wherein the sensor layer further includes a plurality of pads respectively connected to the one second divided trace line and the another second divided trace line.

25. The electronic device of claim 23, wherein the sensor layer further includes a pad electrically connected to the one second divided trace line and the another second divided trace line.

26. The electronic device of claim 23, wherein a shape of the plurality of first divided electrodes is different from a shape of the plurality of second divided electrodes.

* * * * *